United States Patent [19]
Aoyama et al.

[11] Patent Number: 6,075,102
[45] Date of Patent: Jun. 13, 2000

[54] POLYMERIZATION CATALYST AND PROCESS FOR PRODUCING POLYMERS

[75] Inventors: Yoshiaki Aoyama; Norio Tomotsu, both of Ichihara, Japan

[73] Assignee: Idemitsu Kosan Co., Ltd., Tokyo, Japan

[21] Appl. No.: 09/077,319

[22] PCT Filed: Dec. 9, 1996

[86] PCT No.: PCT/JP96/03600

§ 371 Date: Jun. 5, 1998

§ 102(e) Date: Jun. 5, 1998

[87] PCT Pub. No.: WO97/21738

PCT Pub. Date: Jun. 19, 1997

[30] Foreign Application Priority Data

Dec. 12, 1995 [JP] Japan .................................. 7-322808

[51] Int. Cl.[7] ................................ C08F 4/02; B01J 31/06
[52] U.S. Cl. .......................... 526/90; 526/151; 526/160; 526/165; 502/152; 502/161; 502/224; 502/228; 502/242; 502/302; 502/305; 502/349; 502/353
[58] Field of Search .............................. 526/90, 151, 160, 526/165; 502/152, 161, 224, 228, 242, 302, 305, 349, 353

[56] References Cited

U.S. PATENT DOCUMENTS

| | | | |
|---|---|---|---|
| 4,978,730 | 12/1990 | Maezawa et al. | 526/153 |
| 5,596,055 | 1/1997 | Aoyama et al. | 526/153 |
| 5,623,034 | 4/1997 | Aoyama et al. | 526/160 |
| 5,756,416 | 5/1998 | Wasserman et al. | 502/114 |
| 5,756,612 | 5/1998 | Aoyama et al. | 526/153 |

*Primary Examiner*—Mark Kopec
*Assistant Examiner*—Brian P. Mruk
*Attorney, Agent, or Firm*—Oblon, Spivak, McClelland, Maier & Neustadt, P.C.

[57] ABSTRACT

The present invention provides a polymerization catalyst comprising (a) a specific transition metal compound, (b) (i) a compound which can form a complex by reaction with the transition metal compound of component (a) or (ii) a specific compound containing oxygen, and optionally, (c) an alkylating agent, and a process for producing polymers in the presence of said polymerization catalyst.

By using the polymerization catalyst of the present invention, decrease in the contents of residual metals in obtained polymers, simplification of the process for producing polymers, and reduction of the production cost of polymers can be achieved, and polymers having a high molecular weight can be obtained.

6 Claims, No Drawings

POLYMERIZATION CATALYST AND PROCESS FOR PRODUCING POLYMERS

TECHNICAL FIELD

The present invention relates to a polymerization catalyst and a process for producing polymers, and more particularly, to a polymerization catalyst which can produce styrenic polymers having the syndiotactic configuration or polyolefins efficiently at a low cost and a process for producing said polymers.

BACKGROUND ART

Recently, processes for producing a styrenic polymer having the syndiotactic configuration in the presence of a catalyst comprising a transition metal compound, particularly a titanium compound, and methylaluminoxane as the main components have been proposed (the specifications of Japanese Patent Application Laid-Open No. Showa 62(1987)-187708 and other like applications).

In order to produce a styrenic polymer having the syndiotactic configuration efficiently in the above processes without the aluminoxane which is expensive and used in a large amount, processes using a coordinated complex compound comprising an anion having a plurality of groups bonded to a metal and a cation have also been proposed (the specifications of Japanese Patent Application Laid-Open Nos. Heisei 2(1990)-415573 and Heisei 2(1990)-415574 and other like applications).

To polymerize a monomer in the presence of the above catalysts, processes for producing high performance polymers with a high yield in the presence of catalysts formed by reaction of a transition metal compound with a reaction product of an organoaluminum compound with water or a compound which can form an ionic complex by reaction with the transition metal compound are already disclosed.

However, these catalysts cannot always exhibit a sufficient catalytic activity, and large amounts of metals are often left remaining in the formed polymer to cause adverse effects on physical and other properties of the polymer. As the result, complicated facilities are required for the after-treatment of the polymer.

The above processes have other problems in that the catalytic activity is decreased to increase the contents of residual metals in the formed polymer, and decomposition products of the alkylaluminum are left remaining in the polymer, and that, when the temperature of polymerization is increased, the catalytic activity is decreased to increase the contents of residual metals in the formed polymer.

Accordingly, development of a polymerization catalyst which can achieve decrease in the contents of residual metals in obtained polymers, simplification of the process for producing polymers, and reduction of the production cost of polymers has been desired. Development of a polymerization catalyst which provides a polymer having a higher molecular weight than that of polymers obtained in the presence of conventional catalysts has also been desired.

DISCLOSURE OF THE INVENTION

As the result of intensive studies by the present inventors under the above circumstances, it was found that the above problems can be solved by using a polymerization catalyst comprising a transition metal compound having specific substituents and a specific compound containing oxygen for polymerization of monomers, such as styrene and the like. The present invention has been completed on the basis of the above knowledge.

Accordingly, the present invention provides a polymerization catalyst comprising:

(a) a transition metal compound represented by following general formula (1) or general formula (2):

$$(RCOO)MR^1{}_a R^2{}_b R^3{}_{3-(a+b)} \quad (1)$$

$$(RCOO)MR^1{}_c R^2{}_{2-c} \quad (2)$$

wherein M represents a metal of Groups 3 to 6 of the Periodic Table or a lanthanoid metal; R represents hydrogen atom, an alkyl group having 1 to 50 carbon atoms, or an aryl group having 6 to 50 carbon atoms; $R^1$, $R^2$, and $R^3$ each represents hydrogen atom, an alkyl group, an alkoxy group, an aryl group, an alkylaryl group, an arylalkyl group, an aryloxy group, an acyloxy group, vinyl group, allyl group, an ethynyl group, an amino group, an amido group, a phosphido group, an alkylthio group, an arylthio group, a halogen atom, or Cp which represents cyclopentadienyl group, a substituted cyclopentadienyl group, indenyl group, a substituted indenyl group, fluorenyl group, or a substituted fluorenyl group; a and b each represents an integer of 0 to 3; c represents an integer of 0 to 2; any two groups of RCOO and $R^1$ to $R^3$ may be bonded to each other; C represents carbon atom; and O represents oxygen atom; and (b) (i) a compound which can form an ionic complex by reaction with the transition metal compound of component (a) or (ii) a compound containing oxygen which is represented by general formula (3):

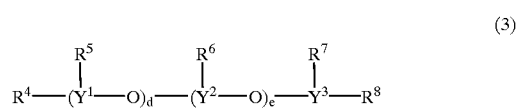

wherein $R^4$ to $R^8$ each represents an alkyl group having 1 to 8 carbon atoms and may be the same with or different from each other, $Y^1$ to $Y^3$ each represents an element of Group 13 of the Periodic Table and may be the same with or different from each other, d and e each represents a number of 0 to 50, and d+e represents 1 or more;

and/or general formula (4):

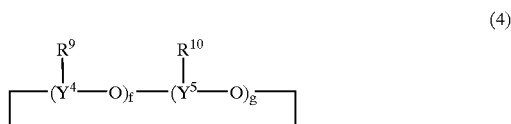

wherein $R^9$ and $R^{10}$ each represents an alkyl group having 1 to 8 carbon atoms and may be the same with or different from each other, $Y^4$ and $Y^5$ each represents an element of Group 13 of the Periodic Table and may be the same with or different from each other, f and g each represents a number of 0 to 50, and f+g represents 1 or more; and (c) an organoaluminum compound, where necessary.

In the present invention, the polymerization catalyst may comprise, as component (b) in place of or in addition to the above compound containing oxygen of component (ii) which is represented by general formula (3) and/or general formula (4), a branched compound containing oxygen, for example, a compound represented by general formula (Z):

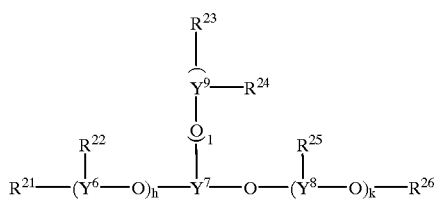

(Z)

wherein $R^{21}$ to $R^{26}$ each represents an alkyl group having 1 to 8 carbon atoms and may be the same with or different from each other, $Y^6$ to $Y^9$ each represents an element of Group 13 of the Periodic Table and may be the same with or different from each other, h, k, and l each represents an integer of 1 to 50, and h+k+l≧3. The polymerization catalyst may comprise a compound containing oxygen which has a plurality of branches. Two or more compounds containing oxygen which are represented by general formula (3), (4), or (Z) described above occasionally form a cage compound by association. Such a cage compound may also be used as component (b). The cage compound containing oxygen may have various forms depending on the number of the compounds containing oxygen which constitute the cage compound and the condition of association. Examples of the cage compound containing oxygen include compounds having the following structures:

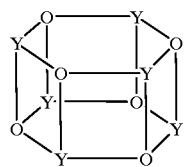

(I)

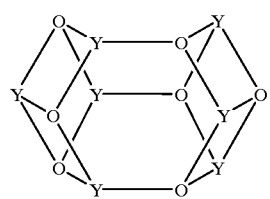

(II)

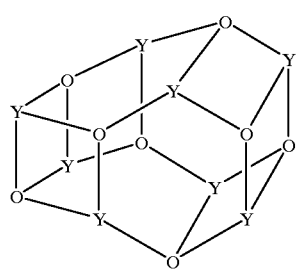

(III)

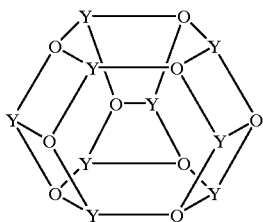

(IV)

wherein Y represents an element of Group 13 of the Periodic Table, O represents oxygen atom, and alkyl groups bonded to Y are not shown.

The present invention also provides a process for producing styrenic polymers comprising polymerizing styrenic monomers in the presence of the above polymerization catalyst.

The present invention is described in more detail in the following.

THE MOST PREFERRED EMBODIMENT TO CARRY OUT THE INVENTION

As the transition metal compound of component (a) used in the present invention, a compound represented by following general formula (1) or general formula (2) is used:

$$RCOO)MR^1{}_a R^2{}_b R^3{}_{3-(a+b)} \qquad (1)$$

$$(RCOO)MR^1{}_c R^2{}_{2-c} \qquad (2)$$

wherein M represents a metal of Groups 3 to 6 of the Periodic Table or a lanthanoid metal; R represents hydrogen atom, an alkyl group having 1 to 50 carbon atoms, or an aryl group having 6 to 50 carbon atoms; $R^1$, $R^2$, and $R^3$ each represents hydrogen atom, an alkyl group, an alkoxy group, an aryl group, an alkylaryl group, an arylalkyl group, an aryloxy group, an acyloxy group, vinyl group, allyl group, an ethynyl group, an amino group, an amido group, a phosphido group, an alkylthio group, an arylthio group, a halogen atom, or Cp which represents cyclopentadienyl group, a substituted cyclopentadienyl group, indenyl group, a substituted indenyl group, fluorenyl group, or a substituted fluorenyl group; a and b each represents an integer of 0 to 3; c represents an integer of 0 to 2; any two groups of RCOO and $R^1$ to $R^3$ may be bonded to each other; C represents carbon atom; and O represents oxygen atom As the metal of Group 3 to 6 of the Periodic Table or the lanthanoid metal represented by M, a metal of Group 4, particularly titanium, zirconium, or hafnium, is preferably used.

In above general formula (1) or (2), R represents an alkyl group having 1 to 50 carbon atoms, preferably 1 to 20 carbon atoms, more preferably 1 to 10 carbon atoms, or an aryl group having 6 to 100 carbon atoms, preferably 6 to 50 carbon atoms, more preferably 6 to 20 atoms. Specific examples include hydrogen atom, methyl group, ethyl group, propyl group, butyl group, phenyl group, fluorobenzene group, trifluorobenzene, pentafluorobenzene, methylbenzene, trimethylbenzene, pentamethylbenzene, butylbenzene, trityl group, and the like.

$R^1$, $R^2$, and $R^3$ in above general formula (1) or (2) each represents hydrogen atom; an alkyl group, preferably an alkyl group having 1 to 20 carbon atoms, such as methyl group, ethyl group, propyl group, butyl group, isobutyl group, amyl group, isoamyl group, octyl group, 2-ethylhexyl group, and the like; an alkoxy group, preferably an alkoxy group having 1 to 20 carbon atoms, such as methoxy group, ethoxy group, propoxy group, butoxy group, amyloxy group, hexyloxy group, 2-ethylhexyloxy group, and the like; an aryl group, preferably an aryl group having 6 to 20 carbon atoms, an alkylaryl group, or an arylalkyl group, such as phenyl group, tolyl group, xylyl group, benzyl group, and the like; an aryloxy group, preferably an aryloxy group having 6 to 20 carbon atoms, such as phenoxy group and the like; an acyloxy group, preferably an acyloxy group having 1 to 50 carbon atoms, such as acetoxy group, benzoyloxy group, trimethylacetoxy group, triphenylacetoxy group, and the like; vinyl group; allyl group; an ethynyl group, such as phenylethynyl group, methylethynyl group, and the like; an amino group, preferably an amino group having 1 to 50 carbon atoms, such as dimethylamino group, diethylamino group, diphenylamino group, bistrimethylsilylamino group, and the like; an amido group, such as acetamido group, ethylamido group, benzamido group, methylphenylamido group, and the like; a phosphido group, such as dimethylphosphido group, diethylphosphido group, diphenylphosphido group, and the like; an alkylthio group, such as methylthio group, ethylthio group, butylthio group, amylthio group, isoamylthio group, isobutylthio group, octylthio group, 2-ethylhexylthio group, and the like; an arylthio group, such as phenylthio group, p-methylphenylthio group, p-methoxyphenylthio group, and the like; or a halogen atom, such as chlorine atom, bromine atom, iodine atom, and fluorine atom.

In addition to the above substituent groups, $R^1$, $R^2$, and $R^3$ each also represents Cp which represents a cyclopentadienyl group; a substituted cyclopentadienyl group, such as methylcyclopentadienyl group, dimethylcyclopentadienyl group, trimethylcyclopentadienyl group, tetramethylcyclopentadienyl group, pentamethylcyclopentadienyl group, and the like; indenyl group; a substituted indenyl group, such as methylindenyl group, dimethylindenyl group, trimethylindenyl group, tetramethylindenyl group, hexamethylindenyl group, 1,2,3-trimethyl-4,5,6,7-tetrahydroindenyl group, 1,2-dimethyl-4,5,6,7-tetrahydroindenyl group, 1,3-dimethyl-4,5,6,7-tetrahydroindenyl group, and the like; fluorenyl group; or a substituted fluorenyl group, such as methylfluorenyl group, dimethylfluorenyl group, tetramethylfluorenyl group, octamethylfluorenyl group, 1,2,3,4,5,6,7,8-octahydrofluorenyl group, 9-methyl-1,2,3,4,5,6,7,8-octahydrofluorenyl group, and the like.

$R^1$, $R^2$, and $R^3$ may be the same with or different from each other.

In above general formula (1) or (2), any two groups of RCOO and $R^1$ to $R^3$ may be bonded to each other through an alkylene group having 1 to 5 carbon atoms; an alkylidene group having 1 to 8 carbon atoms, such as ethylidene group, propylidene group, dimethylcarbyl group, and the like; or an alkylsilyl group having 1 to 20 carbon atoms and 1 to 5 silicon atoms, such as dimethylsilyl group, diethylsilyl group, dibenzylsilyl group, and the like.

Among the above compounds represented by general formula (1) or (2), examples of the titanium complex having no Cp ring include tetra(benzoyloxy)titanium, tetra(acetoxy) titanium, tetra(trimethylacetoxy)titanium, tetra(p-fluorobenzoyloxy)titanium, tetra(triphenylacetoxy)titanium, tetra(formyloxy)titanium, tetra(propionyloxy)titanium, tetra (butyryloxy)titanium, tetra(acryloyloxy)titanium, tetra (propioloyloxy)titanium, tetra(methacryloyloxy)titanium, tetra(naphthoyloxy)titanium, tetra(cyclohexylcarbonyloxy) titanium, tri(benzoyloxy)titanium methoxide, tri(acetoxy) titanium methoxide, tri(trimethylacetoxy)titanium methoxide, tri(p-fluorobenzoyloxy)titanium methoxide, tri (triphenylacetoxy)titanium methoxide, tri(formyloxy) titanium methoxide, tri(propionyloxy)titanium methoxide, tri(butyryloxy)titanium methoxide, tri(acryloyloxy)titanium methoxide, tri(propioloyloxy)titanium methoxide, tri (methacryloyloxy)titanium methoxide, tri(naphthoyloxy) titanium methoxide, tri(cyclohexylcarbonyloxy)titanium methoxide, di(benzoyloxy)titanium dimethoxide, di(acetoxy)titanium dimethoxide, di(trimethylacetoxy) titanium dimethoxide, di(p-fluorobenzoyloxy)titanium dimethoxide, di(triphenylacetoxy)titanium dimethoxide, di(formyloxy)titanium dimethoxide, di(propionyloxy) titanium dimethoxide, di(butyryloxy)titanium dimethoxide, di(acryloyloxy)titanium dimethoxide, di(propioloyloxy) titanium dimethoxide, di(methacryloyloxy)titanium dimethoxide, di(naphthoyloxy)titanium dimethoxide, di(cyclohexylcarbonyloxy)titanium dimethoxide, benzolyoxytitanium trimethoxide, acetoxytitanium trimethoxide, trimethylacetoxytitanium trimethoxide, p-fluorobenzoyloxytitanium trimethoxide, triphenylacetoxytitanium dimethoxide, formyloxytitanium trimethoxide, propionyloxytitanium dimethoxide, butyryloxytitanium trimethoxide, acryloyloxytitanium dimethoxide, propioloyloxytitanium trimethoxide, methacryloyloxytitanium dimethoxide, naphthoyloxytitanium trimethoxide, cyclohexylcarbonyloxytitanium trimethoxide, and the like.

Other examples of the above compounds represented by general formula (1) or (2) include compounds obtained by replacing titanium in the above compounds with zirconium or hafnium and similar compounds of transition metal elements of other Groups of the Periodic Table or the lanthanoid group. However, the above compound represented by general formula (1) or (2) is not limited to the compounds described above as examples. Among these compounds, compounds of titanium are preferable from the standpoint of the catalytic activity.

As the transition metal compound represented by general formula (1) or general formula (2) in which M represents Ti, various compounds can be used. For example, at least one compound selected from titanium compounds represented by following general formula (5) or general formula (6):

$$(RCOO)TiR^{11}_a R^{12}_b R^{13}_{3-(a+b)} \quad (5)$$

$$(RCOO)TiR^{11}_c R^{12}_{2-c} \quad (6)$$

is preferably used

In the above formulae, R, a, b, and c are as defined above. $R^{11}$, $R^{12}$, and $R^{13}$ are the same as $R^1$, $R^2$, and $R^3$ in above general formulae (1) and (2) and may be the same with or different from each other. Among these titanium compounds, compounds having no halogen atom are preferable, and titanium compounds having one π-electronic ligand are more preferable.

Preferable examples of the above transition metal compounds represented by general formula (1) or general formula (2) include compounds represented by following general formula (7) or general formula (8):

$$(RCOO)MCpXY \quad (7)$$

$$(RCOO)MCpX \quad (8)$$

wherein M, R, and Cp are as defined above, X and Y each independently represents hydrogen atom, an alkyl group having 1 to 20 carbon atoms, an alkoxy group having 1 to 20 carbon atoms, an aryl group, an alkylaryl group, or an arylalkyl group each having 6 to 20 carbon atoms, an aryloxy group having 6 to 20 carbon atoms, an acyloxy group having 1 to 50 carbon atoms, vinyl group, allyl group, an ethynyl group, an amino group having 1 to 50 carbon atoms, an amido group, a phosphido group, an alkylthio group, an arylthio group, or a halogen atom, C represents carbon atom, and O represents oxygen atom. Examples of the compounds represented by general formula (7) or (8) include compounds represented by general formula (7) or (8) in which R represents Z described later, and Cp and COO are bonded to each other through Z.

Among the cyclopentadienyl group, the substituted cyclopentadienyl group, the indenyl group, the substituted indenyl group, the fluorenyl group, and the substituted fluorenyl group represented by Cp in general formula (7) or (8), the substituted cyclopentadienyl group is, for example, cyclopentadienyl group substituted with one or more alkyl groups having 1 to 6 carbon atoms. Examples of the substituted cyclopentadienyl group include methylcyclopentadienyl group, 1,2-dimethylcyclopentadienyl group, 1,2,4-trimethylcyclopentadienyl group, 1,2,3,4-tetramethylcyclopentadienyl group, trimethylsilylcyclopentadienyl group, 1,3-di(trimethylsilyl)cyclopentadienyl group, tertiary-butylcyclopentadienyl group, 1,3-di(tertiary-butyl)cyclopentadienyl group, pentamethylcyclopentadienyl group, and the like.

X and Y each independently represents hydrogen atom; an alkyl group having 1 to 20 carbon atoms, preferably 1 to 10 carbon atoms, such as methyl group, ethyl group, propyl group, butyl group, amyl group, isoamyl group, isobutyl group, octyl group, 2-ethylhexyl group, and the like; an alkoxy group having 1 to 20 carbon atoms, such as methoxy group, ethoxy group, propoxy group, butoxy group, amyloxy group, hexyloxy group, 2-ethylhexyloxy group, and the like; an aryl group, an alkylaryl group, or an arylalkyl group each having 6 to 20 carbon atoms, preferably 6 to 10 carbon atoms, such as phenyl group, tolyl group, xylyl group, benzyl group, and the like; an aryloxy group having 6 to 20 carbon atoms, preferably 6 to 10 carbon atoms, such as phenoxy group and the like; an acyloxy group having 1 to 100 carbon atoms, preferably 1 to 50 carbon atoms, such as acetoxy group, benzoyloxy group, trimethylacetoxy group, triphenylacetoxy group, and the like; vinyl group; allyl group; an ethynyl group, such as phenylethynyl group, methylethynyl group, and the like; an amino group having 1 to 50 carbon atoms, preferably 1 to 20 carbon atoms, such as dimethylamino group, diethylamino group, diphenylamino group, bistrimethylsilylamino group, and the like; an amido group, such as acetamido group, ethylamido group, benzamido group, methylphenylamido group, and the like; a phosphido group, such as diemethylphosphido group, diethylphosphido group, diphenylphosphido group, and the like; an alkylthio group, such as methylthio group, ethylthio group, butylthio group, amylthio group, isoamylthio group, isobutylthio group, octylthio group, 2-ethylhexylthio group, and the like; an arylthio group, such as phenylthio group, p-methylphenylthio group, p-methoxyphenylthio group, and the like; or a halogen atom, such as chlorine atom, bromine atom, iodine atom, and fluorine atom.

Examples of the compounds represented by general formula (7) or (8) also include compounds in which RCOO and Cp are bonded to each other through R. When R in these compounds is referred to as Z, Z represents any structure selected from alkylene groups having 1 to 5 carbon atoms; alkylidene groups having 1 to 8 carbon atoms, such as ethylidene group, propylidene group, dimethylcarbyl group, and the like; and alkylsilyl groups having 1 to 20 carbon atoms and 1 to 5 silicon atoms, such as dimethylsilyl group, diethylsilyl group, dibenzylsilyl group, and the like. Specific examples of such compounds include compounds represented by following general formula (9):

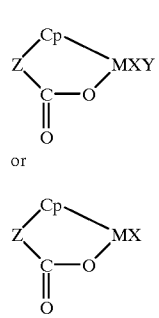

wherein Cp, M, X, and Y are as defined above, Z represents methylene group, ethylene group, dimethylsilylene group, diethylsilylene group, or phenylene group.

More preferable examples of the transition metal compounds among the above compounds represented by general formula (7) or general formula (8) include compounds represented by general formula (7) or general formula (8) in which X and Y each represents an acyloxy group or an alkoxy group, i.e., compounds represented by following general formula (7') or (8'):

wherein M, R, and Cp are as defined above, R" represents an alkyl group having 1 to 20 carbon atoms or an aryl group, an alkylaryl group, or an arylalkyl group each having 1 to 50 carbon atoms, n represents an integer of 1 to 3, and m represents 1 or 2. In above general formula (7') and general formula (8'), M preferably represents titanium.

Examples of the above titanium compounds represented by general formula (7) or (8) include:
(pentamethylcyclopentadienyl)tris(benzoyloxy)titanium,
(pentamethylcyclopentadienyl)tris(acetoxy)titanium,
(pentamethylcyclopentadienyl)tris(trimethylacetoxy) titanium, (pentamethylcyclopentadienyl)tris(p-fluorobenzoyloxy)titanium,
(pentamethylcyclopentadienyl)tris(triphenylacetoxy) titanium, (pentamethylcyclopentadienyl)tris (formyloxy)titanium, (pentamethylcyclopentadienyl) tris(propionyloxy)titanium,
(pentamethylcyclopentadienyl)tris(butyryloxy) titanium, (pentamethylcyclopentadienyl)tris (acryloyloxy)titanium, (pentamethylcyclopentadienyl) tris(propioloyl)titanium,
(pentamethylcyclopentadienyl)tris(methacryloyloxy) titanium, (pentamethylcyclopentadienyl)tris (naphthoyloxy) titanium, (pentamethylcyclopentadienyl)tris (cyclohexylcarbonyloxy)titanium,
(tetramethylcyclopentadienyl)tris(benzoyloxy)titanium, (tetramethylcyclopentadienyl)tris(trimethylacetoxy) titanium, (tetramethylcyclopentadienyl)tris (triphenylacetoxy)titanium, (tetramethyleyclopentadienyl)tris(propionyloxy) titanium, (tetramethylcyclopentadienyl)tris (acryloyloxy)titanium, (tetramethylcyclopentadienyl) tris(methacryloyloxy)titanium, (tetramethylcyclopentadienyl)tris (cyclohexylcarbonyloxy)titanium, (tetramethylcyclopentadienyl)tris(acetoxy)titanium, (tetramethylcyclopentadienyl)tris(p-fluorobenzoyloxy) titanium, (tetramethylcyclopentadienyl)tris(formyloxy) titanium, (tetramethylcyclopentadienyl)tris (butyryloxy)titanium, (tetramethylcyclopentadienyl) tris(propioloyloxy)titanium, (tetramethylcyclopentadienyl)tris(naphthoyloxy) titanium, (trimethylcyclopentadienyl)tris(benzoyloxy)titanium, (trimethylcyclopentadienyl)tris(trimethylacetoxy) titanium, (trimethylcyclopentadienyl)tris (triphenylacetoxy)titanium, (trimethylcyclopentadienyl)tris(propionyloxy) titanium, (trimethylcyclopentadienyl)tris(acryloyloxy) titanium, (trimethylcyclopentadienyl)tris (methacryloyloxy)titanium, (trimethylcyclopentadienyl)tris (cyclohexylcarbonyloxy)titanium, (trimethylcyclopentadienyl)tris(acetoxy)titanium, (trimethylcyclopentadienyl)tris(p-fluorobenzoyloxy) titanium, (trimethylcyclopentadienyl)tris(formyloxy) titanium, (trimethylcyclopentadienyl)tris(butyryloxy) titanium, (trimethylcyclopentadienyl)tris (propioloyloxy)titanium, (trimethylcyclopentadienyl) tris(naphthoyloxy)titanium, (dimethylcyclopentadienyl)tris(benzoyloxy)titanium, (dimethylcyclopentadienyl)tris(trimethylacetoxy) titanium, (dimethylcyclopentadienyl)tris (triphenylacetoxy)titanium, (dimethylcyclopentadienyl)tris(propionyloxy)titanium, (dimethylcyclopentadienyl)tris(acryloyloxy)titanium, (dimethylcyclopentadienyl)tris(methacryloyloxy) titanium, (dimethylcyclopentadienyl)tris (cyclohexylcarbonyloxy)titanium, (dimethylcyclopentadienyl)tris(acetoxy)titanium, (dimethylcyclopentadienyl)tris(p-fluorobenzoyloxy) titanium, (dimethylcyclopentadienyl)tris(formyloxy) titanium, (dimethylcyclopentadienyl)tris(butyryloxy) titanium, (dimethylcyclopentadienyl)tris (propioloyloxy)titanium, (dimethylcyclopentadienyl) tris(naphthoyloxy)titanium, (methylcyclopentadienyl)tris(benzoyloxy)titanium, (methylcyclopentadienyl)tris(trimethylacetoxy) titanium, (methylcyclopentadienyl)tris (triphenylacetoxy)titanium, (methylcyclopentadienyl) tris(propionyloxy)titanium, (methylcyclopentadienyl) tris(acryloyloxy)titanium, (methylcyclopentadienyl) tris(methacryloyloxy)titanium, (methylcyclopentadienyl)tris(cyclohexylcarbonyloxy) titanium, (methylcyclopentadienyl)tris(acetoxy) titanium, (methylcyclopentadienyl)tris(p-fluorobenzoyloxy)titanium, (methylcyclopentadienyl) tris(formyloxy)titanium, (methylcyclopentadienyl)tris (butyryloxy)titanium, (methylcyclopentadienyl)tris (propioloyloxy)titanium, (methylcyclopentadienyl)tris (naphthoyloxy)titanium, (cyclopentadienyl)tris(benzoyloxy)titanium, (cyclopentadienyl)tris(trimethylacetoxy)titanium, (cyclopentadienyl)tris(triphenylacetoxy)titanium, (cyclopentadienyl)tris(propionyloxy)titanium, (cyclopentadienyl)tris(acryloyloxy)titanium, (cyclopentadienyl)tris(methacryloyloxy)titanium, (cyclopentadienyl)tris(cyclohexylcarbonyloxy) titanium, (cyclopentadienyl)tris(acetoxy)titanium, (cyclopentadienyl)tris(p-fluorobenzoyloxy)titanium, (cyclopentadienyl)tris(formyloxy)titanium, (cyclopentadienyl)tris(butyryloxy)titanium, (cyclopentadienyl)tris(propioloyloxy)titanium, (cyclopentadienyl)tris(naphthoyloxy)titanium, (indenyl)tris(benzoyloxy)titanium, (indenyl)tris (trimethylacetoxy)titanium, (indenyl)tris (triphenylacetoxy)titanium, (indenyl)tris (propionyloxy)titanium, (indenyl)tris(acryloyloxy) titanium, (indenyl)tris(methacryloyloxy)titanium, (indenyl)tris(cyclohexylcarbonyloxy)titanium, (indenyl)tris(acetoxy)titanium, (indenyl)tris(p-fluorobenzoyloxy)titanium, (indenyl)tris(formyloxy) titanium, (indenyl)tris(butyryloxy)titanium, (indenyl) tris(propioloyloxy)titanium, (indenyl)tris (naphthoyloxy)titanium, (fluorenyl)tris(benzoyloxy) titanium, (fluorenyl)tris(trimethylacetoxy)titanium, (fluorenyl)tris(triphenylacetoxy)titanium, (fluorenyl) tris(propionyloxy)titanium, (fluorenyl)tris (acryloyloxy)titanium, (fluorenyl)tris (methacryloyloxy)titanium, (fluorenyl)tris (cyclohexylcarbonyloxy)titanium, (fluorenyl)tris (acetoxy)titanium, (fluorenyl)tris(p-fluorobenzoyloxy) titanium, (fluorenyl)tris(formyloxy)titanium, (fluorenyl)tris(butyryloxy)titanium, (fluorenyl)tris (propioloyloxy)titanium, (fluorenyl)tris(naphthoyloxy) titanium, (pentamethylcyclopentadienyl)bis(benzoyloxy)titanium methoxide, (pentamethylcyclopentadienyl)bis (trimethylacetoxy)titanium methoxide, (pentamethylcyclopentadienyl)bis(triphenylacetoxy) titanium methoxide, (pentamethylcyclopentadienyl)bis (propionyloxy)titanium methoxide, (pentamethylcyclopentadienyl)bis(acryloyloxy) titanium methoxide, (pentamethylcyclopentadienyl)bis (methacryloyloxy)titanium methoxide, (pentamethylcyclopentadienyl)bis (cyclohexylcarbonyloxy)titanium methoxide, (pentamethylcyclopentadienyl)bis(acetoxy)titanium methoxide, (pentamethylcyclopentadienyl)bis(p-fluorobenzoyloxy)titanium methoxide, (pentamethylcyclopentadienyl)bis(formyloxy)titanium methoxide, (pentamethylcyclopentadienyl)bis (butyryloxy)titanium methoxide, (pentamethylcyclopentadienyl)bis(propioloyloxy) titanium methoxide, (pentamethylcyclopentadienyl)bis (naphthoyloxy)titanium methoxide, methyl(pentamethylcyclopentadienyl)bis(benzoyloxy) titanium, methyl(pentamethylcyclopentadienyl)bis (trimethylacetoxy)titanium, methyl (pentamethylcyclopentadienyl)bis(triphenylacetoxy) titanium, methyl(pentamethylcyclopentadienyl)bis (propionyloxy)titanium, methyl (pentamethylcyclopentadienyl)bis(acryloyloxy) titanium, methyl(pentamethylcyclopentadienyl)bis (methacryloyloxy)titanium, methyl (pentamethylcyclopentadienyl)bis (cyclohexylcarbonyloxy)titanium, methyl (pentamethylcyclopentadienyl)bis(acetoxy)titanium, methyl(pentamethylcyclopentadienyl)bis(p-fluorobenzoyloxy)titanium, methyl (pentamethylcyclopentadienyl)bis(formyloxy) titanium, methyl(pentamethylcyclopentadienyl)bis (butyryloxy)titanium, methyl (pentamethylcyclopentadienyl)bis(propioloyloxy) titanium, methyl(pentamethylcyclopentadienyl)bis (naphthoyloxy)titanium, (pentamethylcyclopentadienyl)bis(benzoyloxy)titanium chloride, (pentamethylcyclopentadienyl)bis (trimethylacetoxy)titanium chloride, (pentamethylcyclopentadienyl)bis(trphenylacetoxy) titanium chloride, (pentamethylcyclopentadienyl)bis (propionyloxy)titanium chloride, (pentamethylcyclopentadienyl)bis(acryloyloxy) titanium chloride, (pentamethylcyclopentadienyl)bis (methacryloyloxy)titanium chloride, (pentamethylcyclopentadienyl)bis (cyclohexylcarbonyloxy)titanium chloride, (pentamethylcyclopentadienyl)bis(acetoxy)titanium chloride, (pentamethylcyclopentadienyl)bis(p-fluorobenzoyloxy)titanium chloride, (pentamethylcyclopentadienyl)bis(formyloxy)titanium chloride, (pentamethylcyclopentadienyl)bis (butyryloxy)titanium chloride, (pentamethylcyclopentadienyl)bis(propioloyloxy) titanium chloride, (pentamethylcyclopentadienyl)bis (naphthoyloxy)titanium chloride, (pentamethylcyclopentadienyl)(benzoyloxy)titanium dimethoxide, (pentamethylcyclopentadienyl) (trimethylacetoxy)titanium dimethoxide, (pentamethylcyclopentadienyl)(triphenylacetoxy) titanium dimethoxide, (pentamethylcyclopentadienyl) (propionyloxy)titanium dimethoxide, (pentamethylcyclopentadienyl)(acryloyloxy)titanium dimethoxide, (pentamethylcyclopentadienyl) (methacryloyloxy)titanium dimethoxide, (pentamethylcyclopentadienyl) (cyclohexylcarbonyloxy)titanium dimethoxide, (pentamethylcyclopentadienyl)(acetoxy)titanium dimethoxide, (pentamethylcyclopentadienyl)(p-fluorobenzoyloxy)titanium dimethoxide, (pentamethylcyclopentadienyl)(formyloxy)titanium dimethoxide, (pentamethylcyclopentadienyl) (butyryloxy)titanium dimethoxide, (pentamethylcyclopentadienyl)(propioloyloxy) titanium dimethoxide, (pentamethylcyclopentadienyl) (naphthoyloxy)titanium dimethoxide, dimethyl(pentamethylcyclopentadienyl)(benzoyloxy) titanium, dimethyl(pentamethylcyclopentadienyl) (trimethylacetoxy)titanium, dimethyl (pentamethylcyclopentadienyl)(triphenylacetoxy) titanium, dimethyl(pentamethylcyclopentadienyl) (propionyloxy)titanium, dimethyl (pentamethylcyclopentadienyl)(acryloyloxy)titanium, dimethyl(pentamethylcyclopentadienyl) (methacryloyloxy)titanium, dimethyl (pentamethylcyclopentadienyl) (cyclohexylcarbonyloxy)titanium, dimethyl (pentamethylcyclopentadienyl)(acetoxy)titanium, dimethyl(pentamethylcyclopentadienyl)(p-fluorobenzoyloxy)titanium, dimethyl (pentamethylcyclopentadienyl)(formyloxy)titanium, dimethyl(pentamethylcyclopentadienyl)(butyryloxy) titanium, dimethyl(pentamethylcyclopentadienyl) (propioloyloxy)titanium, dimethyl (pentamethylcyclopentadienyl)(naphthoyloxy) titanium, (pentamethylcyclopentadienyl)(benzoyloxy)titanium dichloride, (pentamethylcyclopentadienyl) (trimethylacetoxy)titanium dichloride, (pentamethylcyclopentadienyl)(triphenylacetoxy) titanium dichloride, (pentamethylcyclopentadienyl) (propionyloxy)titanium dichloride, (pentamethylcyclopentadienyl)(acryloyloxy)titanium dichloride, (pentamethylcyclopentadienyl) (methacryloyloxy)titanium dichloride, (pentamethylcyclopentadienyl) (cyclohexylcarbonyloxy)titanium dichloride, (pentamethylcyclopentadienyl)(acetoxy)titanium dichloride, (pentamethylcyclopentadienyl)(p-fluorobenzoyloxy)titanium dichloride, (pentamethylcyclopentadienyl)(formyloxy)titanium dichloride, (pentamethylcyclopentadienyl)(butyryloxy) titanium dichioride, (pentamethylcyclopentadienyl) (propioloyloxy)titanium dichloride, (pentamethylcyclopentadienyl)(naphthoyloxy)titanium dichloride, and the like.

Examples of the above compounds represented by general formula (7) or (8) also include compounds obtained by replacing titanium in the above compounds with zirconium, such as (pentamethylcyclopentadienyl)tris(benzoyloxy) zirconium, (pentamethylcyclopentadienyl)tris(acetoxy) zirconium, and the like; compounds obtained by replacing titanium in the above compounds with hafnium, such as (pentamethylcyclopentadienyl)tris(benzoyloxy)hafnium, (pentamethylcyclopentadienyl)tris(acetoxy)hafnium, and the like; and similar compounds of transition metals of other Groups of the Periodic Table or the lanthanoid group. However, the compound represented by general formula (7) or (8) is not limited to the compounds shown above as examples. Among these compounds, titanium compounds are preferable from the standpoint of the catalytic activity. Any mixture of these compounds may also be used as the catalyst.

The transition metal compound of component (a) may also be at least one compound selected from the group consisting of transition metal compounds having two Cp groups, such as transition metal compounds represented by following general formula (10) or general formula (11):

$$(RCOO)MCp^1Cp^2X \quad (10)$$

$$(RCOO)MCp^1Cp^2 \quad (11)$$

wherein $Cp^1$ and $Cp^2$ each represents cyclopentadienyl group, a substituted cyclopentadienyl group, indenyl group, a substituted indenyl group, fluorenyl group, or a substituted fluorenyl group, and M, R, and X are as defined above.

$Cp^1$ and $Cp^2$ in above general formula (10) or (11) each independently is the same as Cp in general formula (7) and (8) and may be the same with or different from each other. X is as defined above, and more specifically represents hydrogen atom; an alkyl group having 1 to 20 carbon atoms, preferably 1 to 10 carbon atoms, such as methyl group, ethyl group, propyl group, n-butyl group, isobutyl group, amyl group, isoamyl group, octyl group, 2-ethylhexyl group, and the like; an aryl group having 6 to 20 carbon atoms, preferably 6 to 10 carbon atoms, such as phenyl group, naphthyl group, and the like; an arylalkyl group having 7 to 20 carbon atoms, preferably 7 to 10 carbon atoms, such as benzyl group and the like; an alkoxy group having 1 to 20 carbon atoms, preferably 1 to 10 carbon atoms, such as methoxy group, ethoxy group, propoxy group, butoxy group, amyloxy group, hexyloxy group, octyloxy group, 2-ethylhexyloxy group, and the like; an aryloxy group having 6 to 20 carbon atoms, preferably 6 to 10 carbon atoms, such as phenoxy group and the like; an alkylthio group having 1 to 10 carbon atoms, an arylthio group, an amino group, or an acyloxy group having 1 to 100 carbon atoms, preferably 1 to 50 carbon atoms.

In above general formula (10) or (11), $Cp^1$ and $Cp^2$ may be bonded to each other through an alkylene group having 1 to 5 carbon atoms, an alkylidene group having 1 to 8 carbon atoms, such as ethylidene group, propylidene group, dimethylcarbyl group, and the like; or an alkylsilyl group having 1 to 20 carbon atoms and 1 to 5 silicon atoms, such as dimethylsilyl group, diethylsilyl group, dibenzylsilyl group, and the like. Examples of such compounds include compounds represented by following general formula (12):

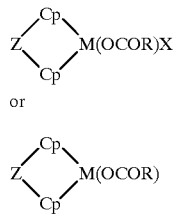

(12)

or wherein R, Cp, and M are as defined above, and Z represents methylene group, ethylene group, dimethylsilylene group, diethylsilylene group, or phenylene group.

Examples of the above compound represented by general formula (10), (11), or (12) include:

bis(pentamethylcyclopentadienyl)bis(benzoyloxy) titanium, bis(pentamethylcyclopentadienyl)bis (acetoxy)titanium, bis(pentamethylcyclopentadienyl) bis(trimethylacetoxy)titanium, bis (pentamethylcyclopentadienyl)bis(p-fluorobenzoyloxy)titanium, bis (pentamethylcyclopentadienyl)bis(triphenylacetoxy) titanium, bis(pentamethylcyclopentadienyl)bis (formyloxy)titanium, bis (pentamethylcyclopentadienyl)bis(propionyloxy) titanium, bis(pentamethylcyclopentadienyl)bis (butyryloxy)titanium, bis (pentamethylcyclopentadienyl)bis(acryloyloxy) titanium, bis(pentamethylcyclopentadienyl)bis (propioloyloxy)titanium, bis (pentamethylcyclopentadienyl)bis(methacryloyloxy) titanium, bis(pentamethylcyclopentadienyl)bis (naphthoyloxy)titanium, bis (pentamethylcyclopentadienyl)bis (cyclohexylcarbonyloxy)titanium, bis(cyclopentadienyl)bis(benzoyloxy)titanium, bis (cyclopentadienyl)bis(acetoxy)titanium, bis (cyclopentadienyl)bis(trirnethylacetoxy)titanium, bis (cyclopentadienyl)bis(p-fluorobenzoyloxy)titanium, bis(cyclopentadienyl)bis(triphenylacetoxy)titanium, bis(cyclopentadienyl)bis(formyloxy)titanium, bis (cyclopentadienyl)bis(propionyloxy)titanium, bis (cyclopentadienyl)bis(butyryloxy)titanium, bis (cyclopentadienyl)bis(acryloyloxy)titanium, bis (cyclopentadienyl)bis(propioloyloxy)titanium, bis (cyclopentadienyl)bis(methacryloyloxy)titanium, bis (cyclopentadienyl)bis(naphthoyloxy)titanium, bis(indenyl)bis(benzoyloxy)titanium, bis(indenyl)bis (acetoxy)titanium, bis(indenyl)bis(trimethylacetoxy) titanium, bis(indenyl)bis(p-fluorobenzoyloxy)titanium, bis(indenyl)bis(triphenylacetoxy)titanium, bis(indenyl) bis(formyloxy)titanium, bis(indenyl)bis(propionyloxy) titanium, bis(indenyl)bis(butyryloxy)titanium, bis (indenyl)bis(acryloyloxy)titanium, bis(indenyl)bis (propioloyloxy)titanium, bis(indenyl)bis (methacryloyloxy)titanium, bis(indenyl)bis (naphthoyloxy)titanium, bis(fluorenyl)bis(benzoyloxy)titanium, bis(fluorenyl)bis (acetoxy)titanium, bis(fluorenyl)bis(trimethylacetoxy) titanium, bis(fluorenyl)bis(p-fluorobenzoyloxy) titanium, bis(fluorenyl)bis(triphenylacetoxy)titanium, bis(fluorenyl)bis(formyloxy)titanium, bis(fluorenyl)bis (propionyloxy)titanium, bis(fluorenyl)bis(butyryloxy) titanium, bis(fluorenyl)bis(acryloyloxy)titanium, bis (fluorenyl)bis(propioloyloxy)titanium, bis(fluorenyl) bis(methacryloyloxy)titanium, bis(fluorenyl)bis (naphthoyloxy)titanium, methylenebis(cyclopentadienyl)bis(benzoyloxy)titanium, methylenebis(cyclopentadienyl)bis(acetoxy)titanium, methylenebis(cyclopentadienyl)bis(trimethylacetoxy) titanium, methylenebis(cyclopentadienyl)bis(p-fluorobenzoyloxy)titanium, methylenebis (cyclopentadienyl)bis(triphenylacetoxy)titanium, methylenebis(cyclopentadienyl)bis(formyloxy) titanium, methylenebis(cyclopentadienyl)bis (propionyloxy)titanium, methylenebis (cyclopentadienyl)bis(butyryloxy)titanium, methylenebis(cyclopentadienyl)bis(acryloyloxy) titanium, methylenebis(cyclopentadienyl)bis (propioloyloxy)titanium, methylenebis (cyclopentadienyl)bis(methacryloyloxy)titanium, methylenebis(cyclopentadienyl)bis(naphthoyloxy) titanium, methylenebis(indenyl)bis(benzoyloxy)titanium, methylenebis(indenyl)bis(acetoxy)titanium, methylenebis(indenyl)bis(trimethylacetoxy)titanium, methylenebis(indenyl)bis(p-fluorobenzoyloxy) titanium, methylenebis(indenyl)bis(triphenylacetoxy) titanium, methylenebis(indenyl)bis(formyloxy) titanium, methylenebis(indenyl)bis(propionyloxy) titanium, methylenebis(indenyl)bis(butyryloxy) titanium, methylenebis(indenyl)bis(acryloyloxy) titanium, methylenebis(indenyl)bis(propioloyloxy) titanium, methylenebis(indenyl)bis(methacryloyloxy) titanium, methylenebis(indenyl)bis(naphthoyloxy) titanium, methylenebis(fluorenyl)bis(benzoyloxy)titanium, methylenebis(fluorenyl)bis(acetoxy)titanium, methylenebis(fluorenyl)bis(trimethylacetoxy)titanium, methylenebis(fluorenyl)bis(p-fluorobenzoyloxy) titanium, methylenebis(fluorenyl)bis(triphenylacetoxy) titanium, methylenebis(fluorenyl)bis(formyloxy) titanium, methylenebis(fluorenyl)bis(propionyloxy) titanium, methylenebis(fluorenyl)bis(butyryloxy) titanium, methylenebis(fluorenyl)bis(acryloyloxy) titanium, methylenebis(fluorenyl)bis(propioloyloxy) titanium, methylenebis(fluorenyl)bis (methacryloyloxy)titanium, methylenebis(fluorenyl) bis(naphthoyloxy)titanium, dimethylsilylenebis(cyclopentadienyl)bis(benzoyloxy) titanium, dimethylsilylenebis(cyclopentadienyl)bis (acetoxy)titanium, dimethylsilylenebis (cyclopentadienyl)bis(trimethylacetoxy)titanium, dimethylsilylenebis(cyclopentadienyl)bis(p-fluorobenzoyloxy)titanium, dimethylsilylenebis (cyclopentadienyl)bis(triphenylacetoxy)titanium, dimethylsilylenebis(cyclopentadienyl)bis(formyloxy) titanium, dimethylsilylenebis(cyclopentadienyl)bis (propionyloxy)titanium, dimethylsilylenebis (cyclopentadienyl)bis(butyryloxy)titanium, dimethylsilylenebis(cyclopentadienyl)bis(acryloyloxy) titanium, dimethylsilylenebis(cyclopentadienyl)bis (propioloyloxy)titanium, dimethylsilylenebis (cyclopentadienyl)bis(methacryloyloxy)titanium, dimethylsilylenebis(cyclopentadienyl)bis (naphthoyloxy)titanium, dimethylsilylenebis(indenyl)bis(benzoyloxy)titanium, dimethylsilylenebis(indenyl)bis(acetoxy)titanium, dimethylsilylenebis(indenyl)bis(trimethylacetoxy)titanium, dimethylsilylenebis(indenyl)bis(p-fluorobenzoyloxy)titanium, dimethylsilylenebis(indenyl)bis(triphenylacetoxy)titanium, dimethylsilylenebis(indenyl)bis(formyloxy)titanium, dimethylsilylenebis(indenyl)bis(propionyloxy)titanium, dimethylsilylenebis(indenyl)bis(butyryloxy)titanium, dimethylsilylenebis(indenyl)bis(acryloyloxy)titanium, dimethylsilylenebis(indenyl)bis(propioloyloxy)titanium, dimethylsilylenebis(indenyl)bis(methacryloyloxy)titanium, dimethylsilylenebis(indenyl)bis(naphthoyloxy)titanium, dimethylsilylenebis(fluorenyl)bis(benzoyloxy)titanium, dimethylsilylenebis(fluorenyl)bis(acetoxy)titanium, dimethylsilylenebis(fluorenyl)bis(trimethylacetoxy)titanium, dimethylsilylenebis(fluorenyl)bis(p-fluorobenzoyloxy)titanium, dimethylsilylenebis(fluorenyl)bis(triphenylacetoxy)titanium, dimethylsilylenebis(fluorenyl)bis(formyloxy)titanium, dimethylsilylenebis(fluorenyl)bis(propionyloxy)titanium, dimethylsilylenebis(fluorenyl)bis(butyryloxy)titanium, dimethylsilylenebis(fluorenyl)bis(acryloyloxy)titanium, dimethylsilylenebis(fluorenyl)bis(propioloyloxy)titanium, dimethylsilylenebis(fluorenyl)bis(methacryloyloxy)titanium, dimethylsilylenebis(fluorenyl)bis(naphthoyloxy)titanium, ethylenebis(cyclopentadienyl)bis(benzoyloxy)titanium, ethylenebis(cyclopentadienyl)bis(acetoxy)titanium, ethylenebis(cyclopentadienyl)bis(trimethylacetoxy)titanium, ethylenebis(cyclopentadienyl)bis(p-fluorobenzoyloxy)titanium, ethylenebis(cyclopentadienyl)bis(triphenylacetoxy)titanium, ethylenebis(cyclopentadienyl)bis(formyloxy)titanium, ethylenebis(cyclopentadienyl)bis(propionyloxy)titanium, ethylenebis(cyclopentadienyl)bis(butyryloxy)titanium, ethylenebis(cyclopentadienyl)bis(acryloyloxy)titanium, ethylenebis(cyclopentadienyl)bis(propioloyloxy)titanium, ethylenebis(cyclopentadienyl)bis(methacryloyloxy)titanium, ethylenebis(cyclopentadienyl)bis(naphthoyloxy)titanium, ethylenebis(indenyl)bis(benzoyloxy)titanium, ethylenebis(indenyl)bis(acetoxy)titanium, ethylenebis(indenyl)bis(trimethylacetoxy)titanium, ethylenebis(indenyl)bis(p-fluorobenzoyloxy)titanium, ethylenebis(indenyl)bis(triphenylacetoxy)titanium, ethylenebis(indenyl)bis(formyloxy)titanium, ethylenebis(indenyl)bis(propionyloxy)titanium, ethylenebis(indenyl)bis(butyryloxy)titanium, ethylenebis(indenyl)bis(acryloyloxy)titanium, ethylenebis(indenyl)bis(propioloyloxy)titanium, ethylenebis(indenyl)bis(methacryloyloxy)titanium, ethylenebis(indenyl)bis(naphthoyloxy)titanium, ethylenebis(fluorenyl)bis(benzoyloxy)titanium, ethylenebis(fluorenyl)bis(acetoxy)titanium, ethylenebis(fluorenyl)bis(trimethylacetoxy)titanium, ethylenebis(fluorenyl)bis(p-fluorobenzoyloxy)titanium, ethylenebis(fluorenyl)bis(triphenylacetoxy)titanium, ethylenebis(fluorenyl)bis(formyloxy)titanium, ethylenebis(fluorenyl)bis(propionyloxy)titanium, ethylenebis(fluorenyl)bis(butyryloxy)titanium, ethylenebis(fluorenyl)bis(acryloyloxy)titanium, ethylenebis(fluorenyl)bis(propioloyloxy)titanium, ethylenebis(fluorenyl)bis(methacryloyloxy)titanium, ethylenebis(fluorenyl)bis(naphthoyloxy)titanium, methylene(cyclopentadienyl)(indenyl)bis(benzoyloxy)titanium, methylene(cyclopentadienyl)(indenyl)bis(acetoxy)titanium, methylene(cyclopentadienyl)(indenyl)bis(trimethylacetoxy)titanium, methylene(cyclopentadienyl)(indenyl)bis(p-fluorobenzoyloxy)titanium, methylene(cyclopentadienyl)(indenyl)bis(triphenylacetoxy)titanium, methylene(cyclopentadienyl)(indenyl)bis(formyloxy)titanium, methylene(cyclopentadienyl)(indenyl)bis(propionyloxy)titanium, methylene(cyclopentadienyl)(indenyl)bis(butyryloxy)titanium, methylene(cyclopentadienyl)(indenyl)bis(acryloyloxy)titanium, methylene(cyclopentadienyl)(indenyl)bis(propioloyloxy)titanium, methylene(cyclopentadienyl)(indenyl)bis(methacryloyloxy)titanium, methylene(cyclopentadienyl)(indenyl)bis(naphthoyloxy)titanium, methylene(cyclopentadienyl)(fluorenyl)bia(benzoyloxy)titanium, methylene(cyclopentadienyl)(fluorenyl)bis(acetoxy)titanium, methylene(cyclopentadienyl)(fluorenyl)bis(trimethylacetoxy)titanium, methylene(cyclopentadienyl)(fluorenyl)bis(p-fluorobenzoyloxy)titanium, methylene(cyclopentadienyl)(fluorenyl)bis(triphenylacetoxy)titanium, methylene(cyclopentadienyl)(fluorenyl)bis(formyloxy)titanium, methylene(cyclopentadienyl)(fluorenyl)bis(propionyloxy)titanium, methylene(cyclopentadienyl)(fluorenyl)bis(butyryloxy)titanium, methylene(cyclopentadienyl)(fluorenyl)bis(acryloyloxy)titanium, methylene(cyclopentadienyl)(fluorenyl)bis(propioloyloxy)titanium, methylene(cyclopentadienyl)(fluorenyl)bis(methacryloyloxy)titanium, methylene(cyclopentadienyl)(fluorenyl)bis(naphthoyloxy)titanium, dimethylsilylene(cyclopentadienyl)(indenyl)bis(benzoyloxy)titanium, dimethylsilylene(cyclopentadienyl)(indenyl)bis(acetoxy)titanium, dimethylsilylene(cyclopentadienyl)(indenyl)bis(trimethylacetoxy)titanium, dimethylsilylene(cyclopentadienyl)(indenyl)bis(p-fluorobenzoyloxy)titanium, dimethylsilylene(cyclopentadienyl)(indenyl)bis(triphenylacetoxy)titanium, dimethylsilylene(cyclopentadienyl)(indenyl)bis(formyloxy)titanium, dimethylsilylene(cyclopentadienyl)(indenyl)bis(propionyloxy)titanium, dimethylsilylene(cyclopentadienyl)(indenyl)bis(butyryloxy)titanium, dimethylsilylene(cyclopentadienyl)(indenyl)bis(acryloyloxy)titanium, dimethylsilylene(cyclopentadienyl)(indenyl)bis(propioloyloxy)titanium, dimethylsilylene(cyclopentadienyl)(indenyl)bis(methacryloyloxy)titanium, dimethylsilylene(cyclopentadienyl)(indenyl)bis(naphthoyloxy)titanium, dimethylsilylene(cyclopentadienyl)(fluorenyl)bis(benzoyloxy)titanium, dimethylsilylene(cyclopentadienyl)(fluorenyl)bis(acetoxy)titanium, dimethylsilylene(cylopentadienyl)(fluorenyl)bis(trimethylacetoxy)titanium, dimethylsilylene(cyclopentadienyl)(fluorenyl)bis(p-fluorobenzzoyooxytitanium, direthylsilylene(cyclopentadienyl)(fluorenyl)bis(triphenylacetoxy)titanium, dimethylsilylene(cyclopentadienyl)(fluorenyl)bis(formyloxy)titanium, dimethylsilylene(cyclopentadienyl)(fluorenyl)bis(propionyloxy)titanium, dimethylsilylene(cyclopentadienyl)(fluorenyl)bis(fotrmyloxy)titanium, dimethylsilylene(cyclopentadienyl)(fluorenyl)bis(acryloyloxy)titanium, dimethylsilylene(cyclopentadienyl)(fluorenyl)bis(propioloyloxy)titanium, dimethylsilylene(cyclopentadienyl)(fluorenyl)bis(methacryloyloxy)titanium, dimethylsilylene(cyclopentadienyl)(fluorenyl)bis(naphthoyloxy)titanium, and the like.

Examples of the above compounds represented by general formula (10), (11), or (12) also include compounds obtained by replacing titanium in the above compounds with zirconium, such as bis(pentamethylcyclopentadienyl)bis(benzoyloxy)zirconium, ethylidenebis(pentamethylcyclopentadienyl)bis(benzoyloxy)zirconium, and the like; compounds obtained by replacing titanium in the above compounds with hafnium, such as bis(pentamethylcyclopentadienyl)bis(benzoyloxy)hafnium, ethylidenebis(pentamethylcyclopentadienyl)bis(benzoyloxy)hafnium, and the like; and similar compounds of transition metals of other Groups of the Periodic Table or the lanthanoid group. Of course, the compound represented by general formula (10), (11), or (12) is not limited to the compounds shown above as examples. Among these compounds, titanium compounds are preferable from the standpoint of the catalytic activity. Any mixture of these compounds may also be used as the catalyst.

The transition metal compound of component (a) may also be at least one compound selected from the group consisting of transition metal compounds represented by following general formula (13):

$$(RCOO)R'MX'_{p-2}L^1_q \qquad (13)$$

wherein R is as defined above, R' represents a π-electronic ligand which is a condensed polycyclic cyclopentadienyl group in which at least one of the cyclic structures formed by condensation of cyclopentadienyl groups is a saturated ring, M is as defined above, X' is the same as X defined above, a plurality of X' may be the same with or different from each other and may be bonded to each other through any group, $L^1$ represents a Lewis base, p represents a valence of M, q represents 0, 1, or 2, and, when there are a plurality of $L^1$, a plurality of $L^1$ may be the same with or different from each other.

In above general formula (13), R' represents a π-electronic ligand which is a condensed polycyclic cyclopentadienyl group in which at least one of the cyclic structures formed by condensation of cyclopentadienyl groups is a saturated ring. Examples of the condensed polycyclic bcyclopentadienyl group include groups selected from the group consisting of condensed polycyclic cyclopentadienyl groups represented by general formulae (14) to (16):

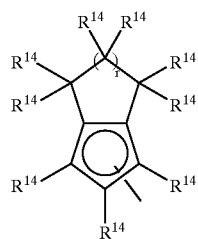

(14)

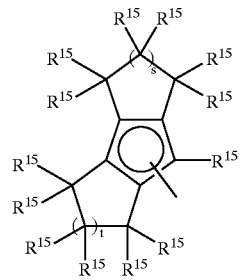

(15)

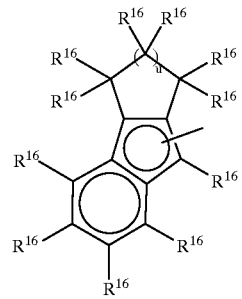

(16)

wherein $R^{14}$, $R^{15}$, and $R^{16}$ each represents hydrogen atom, a halogen atom, an aliphatic hydrocarbon group having 1 to 20 carbon atoms, an aromatic hydrocarbon group having 6 to 20 carbon atoms, an alkoxy group having 1 to 20 carbon atoms, an aryloxy group having 6 to 20 carbon atoms, a thioalkoxy group having 1 to 20 carbon atoms, a thioaryloxy group having 6 to 20 carbon atoms, an amino group, an amido group, carboxyl group, or an alkylsilyl group; $R^{14}$, $R^{15}$, and $R^{16}$ may be the same with or different from each other; a plurality of groups represented by $R^{14}$, $R^{15}$, or $R^{16}$ may be the same with or different from each other; and r, s, t and u each represents an integer of 1 or more.

Examples of R' include 4,5,6,7-tetrahydroindenyl group, 1-methyl-4,5,6,7-tetrahydroindenyl group, 2-methyl-4,5,6,7-tetrahydroindenyl group, 1,2-dimethyl-4,5,6,7-tetrahydroindenyl group, 1,3-dimethyl-4,5,6,7-tetrahydroindenyl group, 1,2,3-trimethyl-4,5,6,7-tetrahydroindenyl group, 1,2,3,4,5,6,7-heptamethyl-4,5,6,7-tetrahydroindenyl group, 1,2,4,5,6,7-hexamethyl-4,5,6,7-tetrahydroindenyl group, 1,3,4,5,6,7-hexamethyl-4,5,6,7-tetrahydroindenyl group, octahydrofluorenyl group, 1,2,3,4-tetrahydrofluorenyl group, 9-methyl-1,2,3,4-tetrahydrofluorenyl group, 9-methyloctahydrofluorenyl group, 1,2,3,4,5,6,7,8-octahydrofluorenyl group, and the like.

M represents a metal of Groups 3 to 6 of the Periodic Table or a lanthanoid metal, such as titanium, zirconium, hafnium, a lanthanoid metal, niobium, tantalum, and the like. Among these metals, titanium is preferable from the standpoint of the catalytic activity. X' is the same as X defined above and represents hydrogen atom, a halogen atom, an aliphatic hydrocarbon group having 1 to 50 carbon atoms, an aromatic hydrocarbon group having 6 to 50 carbon atoms, an alkoxy group having 1 to 20 carbon atoms, an aryloxy group having 6 to 20 carbon atoms, a thioalkoxy group having 1 to 20 carbon atoms, a thioaryloxy group having 6 to 20 carbon atoms, an amino group, an amido group, carboxyl group, an alkylsilyl group, an acyloxy group, and the like. A plurality of X' may be the same with or different from each other and may be bonded to each other through any group. Examples of the atoms and groups represented by X' include hydrogen atom, chlorine atom, bromine atom, iodine atom, methyl group, benzyl group, phenyl group, trimethylsilyl group, methoxy group, ethoxy group, phenoxy group, thiomethoxy group, thiophenoxy group, dimethylamino group, diisopropylamino group, acetoxy group, trimethylacetoxy group, triphenylacetoxy group, benzoyloxy group, and the like. $L^1$ represents a Lewis base, p represents a valence of M, and q represents 0, 1, or 2.

As the transition metal compound represented by general formula (13), compounds having any atoms and groups selected from the group consisting of the atoms and the groups represented by R' and X' which are described above as examples are preferably used.

Examples of the transition metal compounds represented by general formula (13) include:

(1,2,3-trimethyl-4,5,6,7-tetrahydroindenyl)tris(benzoyloxy)titanium, (1,2,3-trimethyl-4,5,6,7-tetrahydroindenyl)tris(acetoxy)titanium, (1,2,3-trimethyl-4,5,6,7-tetrahydroindenyl)tris(trimethylacetoxy)titanium, (1,2,3-trimethyl-4,5,6,7-tetrahydroindenyl)tris(p-fluorobenzoyloxy)titanium, (1,2,3-trimethyl-4,5,6,7-tetrahydroindenyl)tris(triphenylacetoxy)titanium, (1,2,3-trimethyl-4,5,6,7-tetrahydroindenyl)tris(formyloxy)titanium, (1,2,3-trimethyl-4,5,6,7-tetrahydroindenyl)tris(propionyloxy)titanium, (1,2,3-trimethyl-4,5,6,7-tetrahydroindenyl)tris(butyryloxy)titanium, (1,2,3-trimethyl-4,5,6,7-tetrahydroindenyl)tris(acryloyloxy)titanium, (1,2,3-trimethyl-4,5,6,7-tetrahydroindenyl)tris(propioloyloxy)titanium, (1,2,3-trimethyl-4,5,6,7-tetrahydroindenyl)tris(methacryloyloxy)titanium, (1,2,3-trimethyl-4,5,6,7-tetrahydroindenyl)tris(naphthoyloxy)titanium, (1,2,3-trimethyl-4,5,6,7-tetrahydroindenyl)tris(cyclohexylcarbonyloxy)titanium, (1,2-dimethyl-4,5,6,7-tetrahydroindenyl)tris(benzoyloxy)titanium, (1,2-dimethyl-4,5,6,7-tetrahydroindenyl)tris(acetoxy)titanium, (1,2-dimethyl-4,5,6,7-tetrahydroindenyl)tris(trimethylacetoxy)titanium, (1,2-dimethyl-4,5,6,7-tetrahydroindenyl)tris(p-fluorobenzoyloxy)titanium, (1,2-dimethyl-4,5,6,7-tetrahydroindenyl)tris(triphenylacetoxy)titanium, (1,2-dimethyl-4,5,6,7-tetrahydroindenyl)tris(formyloxy)titanium, (1,2-dimethyl-4,5,6,7-tetrahydroindenyl)tris(propionyloxy)titanium, (1,2-dimethyl-4,5,6,7-tetrahydroindenyl)tris(butyryloxy)titanium, (1,2-dimethyl-4,5,6,7-tetrahydroindenyl)tris(acryloyloxy)titanium, (1,2-dimethyl-4,5,6,7-tetrahydroindenyl)tris(propioloyloxy)titanium, (1,2-dimethyl-4,5,6,7-tetrahydroindenyl)tris(methacryloyloxy)titanium, (1,2-dimethyl-4,5,6,7-tetrahydroindenyl)tris(naphthoyloxy)titanium, (1,2-dimethyl-4,5,6,7-tetrahydroindenyl)tris(cyclohexylcarbonyloxy)titanium, (1,3-dimethyl-4,5,6,7-tetrahydroindenyl)tris(benzoyloxy)titanium, (1,3-dimethyl-4,5,6,7-tetrahydroindenyl)tris(acetoxy)titanium, (1,3-dimethyl-4,5,6,7-tetrahydroindenyl)tris(trimethylacetoxy)titanium, (1,3-dimethyl-4,5,6,7-tetrahydroindenyl)tris(p-fluorobenzoyloxy)titanium, (1,3-dimethyl-4,5,6,7-tetrahydroindenyl)tris(triphenylacetoxy)titanium, (1,3-dimethyl-4,5,6,7-tetrahydroindenyl)tris(formyloxy)titanium, (1,3-dimethyl-4,5,6,7-tetrahydroindenyl)tris(propionyloxy)titanium, (1,3-dimethyl-4,5,6,7-tetrahydroindenyl)tris(butyryloxy)titanium, (1,3-dimethyl-4,5,6,7-tetrahydroindenyl)tris(acryloyloxy)titanium, (1,3-dimethyl-4,5,6,7-tetrahydroindenyl)tris(propioloyloxy)titanium, (1,3-dimethyl-4,5,6,7-tetrahydroindenyl)tris(methacryloyloxy)titanium, (1,3-dimethyl-4,5,6,7-tetrahydroindenyl)tris(naphthoyloxy)titanium, (1,3-dimethyl-4,5,6,7-tetrahydroindenyl)tris(cyclohexylcarbonyloxy)titanium, (1,2,3,4,5,6,7,8-octahydrofluorenyl)tris(benzoyloxy)titanium, (1,2,3,4,5,6,7,8-octahydrofluorenyl)tris(acetoxy)titanium, (1,2,3,4,5,6,7,8-octahydrofluorenyl)tris(trimethylacetoxy)titanium, (1,2,3,4,5,6,7,8-octahydrofluorenyl)tris(p-fluorobenzoyloxy)titanium, (1,2,3,4,5,6,7,8-octahydrofluorenyl)tris(triphenylacetoxy)titanium, (1,2,3,4,5,6,7,8-octahydrofluorenyl)tris(formyloxy)titanium, (1,2,3,4,5,6,7,8-octahydrofluorenyl)tris(propionyloxy)titanium, (1,2,3,4,5,6,7,8-octahydrofluorenyl)tris(buty ryloxy)titanium, (1,2,3,4,5,6,7,8-octahydrofluorenyl)tris(acryloyloxy)titanium, (1,2,3,4,5,6,7,8-octahydrofluorenyl)tris(propioloyloxy)titanium, (1,2,3,4,5,6,7,8-octahydrofluorenyl)tris(methacryloyloxy)titanium, (1,2,3,4,5,6,7,8-octahydrofluorenyl)tris(naphthoyloxy)titanium, (1,2,3,4,5,6,7,8-octahydrofluorenyl)tris(cyclohexylcarbonyloxy)titanium, (9-methyl-1,2,3,4,5,6,7,8-octahydrofluorenyl)tris(benzoyloxy)titanium, (9-methyl-1,2,3,4,5,6,7,8-octahydrofluorenyl)tris(acetoxy)titanium, (9-methyl-1,2,3,4,5,6,7,8-octahydrofluorenyl)tris(trimethylacetoxy)titanium, (9-methyl-1,2,3,4,5,6,7,8-octahydrofluorenyl)tris(p-fluorobenzoyloxy)titanium, (9-methyl-1,2,3,4,5,6,7,8-octahydrofluorenyl)tris(triphenylacetoxy)titanium, (9-methyl-1,2,3,4,5,6,7,8-octahydrofluorenyl)tris(formyloxy)titanium, (9-methyl-1,2,3,4,5,6,7,8-octahydrofluorenyl)tris(propionyloxy)titanium, (9-methyl-1,2,3,4,5,6,7,8-octahydrofluorenyl)tris(butyryloxy)titanium, (9-methyl-1,2,3,4,5,6,7,8-octahydrofluorenyl)tris(acryloyloxy)titanium, (9-methyl-1,2,3,4,5,6,7,8-octahydrofluorenyl)tris(propioloyloxy)titanium, (9-methyl-1,2,3,4,5,6,7,8-octahydrofluorenyl)tris(methacryloyloxy)titanium, (9-methyl-1,2,3,4,5,6,7,8-octahydrofluorenyl)tris(naphthoyloxy)titanium, (9-methyl-1,2,3,4,5,6,7,8-octahydrofluorenyl)tris(cyclohexylcarbonyloxy)titanium, (1,2,3,4,5,6,7,8-octahydrofluorenyl)bis(benzoyloxy)titanium methoxide, (1,2,3,4,5,6,7,8-octahydrofluorenyl)bis(acetoxy)titanium methoxide, (1,2,3,4,5,6,7,8-octahydrofluorenyl)bis(trimethylacetoxy)titanium methoxide, (1,2,3,4,5,6,7,8-octahydrofluorenyl)bis(p-fluorobenzoyloxy)titanium methoxide, (1,2,3,4,5,6,7,8-octahydrofluorenyl)bis(triphenylacetoxy)titanium methoxide, (1,2,3,4,5,6,7,8-octahydrofluorenyl)bis(formyloxy)titanium methoxide, (1,2,3,4,5,6,7,8-octahydrofluorenyl)bis(propionyloxy)titanium methoxide, (1,2,3,4,5,6,7,8-octahydrofluorenyl)bis(butyryloxy)titanium methoxide, (1,2,3,4,5,6,7,8-octahydrofluorenyl)bis(acryloyloxy)titanium methoxide, (1,2,3,4,5,6,7,8-octahydrofluorenyl)bis(propioloyloxy)titanium methoxide, (1,2,3,4,5,6,7,8-octahydrofluorenyl)bis(methacryioyloxy)titanium methoxide, (1,2,3,4,5,6,7,8-octahydrofluorenyl)bis(naphthoyloxy)titanium methoxide, (1,2,3,4,5,6,7,8-octahydrofluorenyl)bis(cyclohexylcarbonyloxy)titanium methoxide, (9-methyl-1,2,3,4,5,6,7,8-otahydrofluorenyouoyl)bis(benzoyloxy)titanium methoxide, (9-methyl-1,2,3,4,5,6,7,8-octahydrofluorenyl)bis(acetoxy)titanium methoxide, (9-methyl-1,2,3,4,5,6,7,8- octahydrofluorenyl)bis(trimethylacetoxy)titanium methoxide, (9-methyl-1,2,3,4,5,6,7,8-octahydrofluorenyl)bis(p-fluorobenzoyloxy)titanium methoxide, (9-methyl-1,2,3,4,5,6,7,8-octahydrofluorenyl)bis(triphenylacetoxy)titanium methoxide, (9-methyl-1,2,3,4,5,6,7,8-octahydrofluorenyl)bis(formyloxy)titanium methoxide, (9-methyl-1,2,3,4,5,6,7,8-octahydrofluorenyl)bis(propionyloxy)titanium methoxide, (9-methyl-1,2,3,4,5,6,7,8-octahydrofluorenyl)bis(butyryloxy)titanium methoxide, (9-methyl-1,2,3,4,5,6,7,8-octahydrofluorenyl)bis(acryloyloxy)titanium methoxide, (9-methyl-1,2,3,4,5,6,7,8-octahydrofluorenyl)bis(propioloyloxy)titanium methoxide, (9-methyl-1,2,3,4,5,6,7,8-octahydrofluorenyl)bis(methacryloyloxy)titanium methoxide, (9-methyl-1,2,3,4,5,6,7,8-octahydrofluorenyl)bis(naphthoyloxy)titanium methoxide, (9-methyl-1,2,3,4,5,6,7,8-octahydrofluorenyl)bis(cyclohexylcarbonyloxy)titanium methoxide, methyl(1,2,3,4,5,6,7,8-octahydrofluorenyl)bis(benzoyloxy)titanium, methyl(1,2,3,4,5,6,7,8-octahydrofluorenyl)bis(acetoxy)titanium, methyl(1,2,3,4,5,6,7,8-octahydrofluorenyl)bis(trimethylacetoxy)titanium, methyl(1,2,3,4,5,6,7,8-octahydrofluorenyl)bis(p-fluorobenzoyloxy)titanium, methyl(1,2,3,4,5,6,7,8-octahydrofluorenyl)bis(triphenylacetoxy)titanium, methyl(1,2,3,4,5,6,7,8-octahydrofluorenyl)bis(formyloxy)titanium, methyl(1,2,3,4,5,6,7,8-octahydrofluorenyl)bis(propionyloxy)titanium, methyl(1,2,3,4,5,6,7,8-octahydrofluorenyl)bis(butyryloxy)titanium, methyl(1,2,3,4,5,6,7,8-octahydrofluorenyl)bis(acryloyloxy)titanium, methyl(1,2,3,4,5,6,7,8-octahydrofluorenyl)bis(propioloyloxy)titanium, methyl(1,2,3,4,5,6,7,8-octahydrofluorenyl)bis(methacryloyloxy)titanium, methyl(1,2,3,4,5,6,7,8-octahydrofluorenyl)bis(naphthoyloxy)titanium, methyl(1,2,3,4,5,6,7,8-octahydrofluorenyl)bis(cyclohexylcarbonyloxy)titanium, methyl(9-methyl-1,2,3,4,5,6,7,8-octahydrofluorenyl)bis(benzoyloxy)titanium, methyl(9-methyl-1,2,3,4,5,6,7,8-octahydrofluorenyl)bis(acetoxy)titanium, methyl(9-methyl-1,2,3,4,5,6,7,8-octahydrofluorenyl)bis(trimethylacetoxy)titanium, methyl(9-methyl-1,2,3,4,5,6,7,8-octahydrofluorenyl)bis(p-fluorobenzoyloxy)titanium, methyl(9-methyl-1,2,3,4,5,6,7,8-octahydrofluorenyl)bis(triphenylacetoxy)titanium, methyl(9-methyl-1,2,3,4,5,6,7,8-octahydrofluorenyl)bis(formyloxy)titanium, methyl(9-methyl-1,2,3,4,5,6,7,8-octahydrofluorenyl)bis(propionyloxy)titanium, methyl(9-methyl-1,2,3,4,5,6,7,8-octahydrofluorenyl)bis(butyryloxy)titanium, methyl(9-methyl-1,2,3,4,5,6,7,8-octahydrofluorenyl)bis(acryloyloxy)titanium, methyl(9-methyl-1,2,3,4,5,6,7,8-octahydrofluorenyl)bis(propioloyloxy)titanium, methyl(9-methyl-1,2,3,4,5,6,7,8-octahydrofluorenyl)bis(methacryloyloxy)titanium, methyl(9-methyl-1,2,3,4,5,6,7,8-octahydrofluorenyl)bis(naphthoyloxy)titanium, methyl(9-methyl-1,2,3,4,5,6,7,8-octahydrofluorenyl)bis(cyclohexylcarbonyloxy)titanium, (1,2,3,4,5,6,7,8-octahydrofluorenyl)bis(benzoyloxy)titanium chloride, (1,2,3,4,5,6,7,8-octahydrofluorenyl)bis(acetoxy)titanium chloride, (1,2,3,4,5,6,7,8-octahydrofluorenyl)bis(trimethylacetoxy)titanium chloride, (1,2,3,4,5,6,7,8-octahydrofluorenyl)bis(p-fluorobenzoyloxy)titanium chloride, (1,2,3,4,5,6,7,8-octahydrofluorenyl)bis(triphenylacetoxy)titanium chloride, (1,2,3,4,5,6,7,8-octahydrofluorenyl)bis(formyloxy)titanium chloride, (1,2,3,4,5,6,7,8-octahydrofluorenyl)bis(propionyloxy)titanium chloride, (1,2,3,4,5,6,7,8-octahydrofluorenyl)bis(butyryloxy)titanium chloride, (1,2,3,4,5,6,7,8-octahydrofluorenyl)bis(acryloyloxy)titanium chloride, (1,2,3,4,5,6,7,8-octahydrofluorenyl)bis(propioloyloxy)titanium chloride, (1,2,3,4,5,6,7,8-octahydrofluorenyl)bis(methacryloyloxy)titanium chloride, (1,2,3,4,5,6,7,8-octahydrofluorenyl)bis(naphthoyloxy)titanium chloride, (1,2,3,4,5,6,7,8-octahydrofluorenyl)bis(cyclohexylcarbonyloxy)titanium chloride, (9-methyl-1,2,3,4,5,6,7,8-octahydrofluorenyl)bis(benzoyloxy)titanium chloride, (9-methyl-1,2,3,4,5,6,7,8-octahydrofluorenyl)bis(acetoxy)titanium chloride, (9-methyl-1,2,3,4,5,6,7,8-octahydrofluorenyl)bis(trimethylacetoxy)titanium chloride, (9-methyl-1,2,3,4,5,6,7,8-octahydrofluorenyl)bis(p-fluorobenzoyloxy)titanium chloride, (9-methyl-1,2,3,4,5,6,7,8-octahydrofluorenyl)bis(triphenylacetoxy)titanium chloride, (9-methyl-1,2,3,4,5,6,7,8-octahydrofluorenyl)bis(formyloxy)titanium chloride, (9-methyl-1,2,3,4,5,6,7,8-octahydrofluorenyl)bis(propionyloxy)titanium chloride, (9-methyl-1,2,3,4,5,6,7,8-octahydrofluorenyl)bis(butyryloxy)titanium chloride, (9-methyl-1,2,3,4,5,6,7,8-octahydrofluorenyl)bis(acryloyloxy)titanium chloride, (9-methyl-1,2,3,4,5,6,7,8-octahydrofluorenyl)bis(propioloyloxy)titanium chloride, (9-methyl-1,2,3,4,5,6,7,8-octahydrofluorenyl)bis(methacryloyloxy)titanium chloride, (9-methyl-1,2,3,4,5,6,7,8-octahydrofluorenyl)bis(naphthoyloxy)titanium chloride, (9-methyl-1,2,3,4,5,6,7,8-octahydrofluorenyl)bis(cyclohexylcarbonyloxy)titanium chloride, (1,2,3,4,5,6,7,8-octahydrofluorenyl)(benzoyloxy)titanium dimethoxide, (1,2,3,4,5,6,7,8-octahydrofluorenyl)(acetoxy)titanium dimethoxide, (1,2,3,4,5,6,7,8-octahydrofluorenyl)(trimethylacetoxy)titanium dimethoxide, (1,2,3,4,5,6,7,8-octahydrofluorenyl)(p-fluorobenzoyloxy)titanium dimethoxide, (1,2,3,4,5,6,7,8-octahydrofluorenyl)(triphenylacetoxy)titanium dimethoxide, (1,2,3,4,5,6,7,8-octahydrofluorenyl)(formyloxy)titanium dimethoxide, (1,2,3,4,5,6,7,8-octahydrofluorenyl)(propionyloxy)titanium dimethoxide, (1,2,3,4,5,6,7,8-octahydrofluorenyl)(butyryloxy)titanium dimethoxide, (1,2,3,4,5,6,7,8-octahydrofluorenyl)(acryloyloxy)titanium dimethoxide, (1,2,3,4,5,6,7,8-octahydrofluorenyl)(propioloyloxy)titanium dimethoxide, (1,2,3,4,5,6,7,8-octahydrofluorenyl)(methacryloyloxy)titanium dimethoxide, (1,2,3,4,5,6,7,8-octahydrofluorenyl)(naphthoyloxy)titanium dimethoxide, (1,2,3,4,5,6,7,8-octahydrofluorenyl)(cyclohexylcarbonyloxy)titanium dimethoxide, (9-methyl-1,2,3,4,5,6,7,8-octahydrofluorenyl)(benzoyloxy)titanium dimethoxide, (9-methyl-1,2,3,4,5,6,7,8-octahydrofluorenyl)(acetoxy)titanium dimethoxide, (9-methyl-1,2,3,4,5,6,7,8-octahydrofluorenyl)(trimethylacetoxy)titanium dimethoxide, (9-methyl-1,2,3,4,5,6,7,8-octahydrofluorenyl)(p-fluorobenzoyloxy)titanium dimethoxide, (9-methyl-1,2,3,4,5,6,7,8-octahydrofluorenyl)(tiphenylacetoxy)titanium dimethoxide, (9-methyl-1,2,3,4,5,6,7,8-octahydrofluorenyl)(formyloxy)titanium dimethoxide, (9-methyl-1,2,3,4,5,6,7,8-octahydrofluorenyl) (propionyloxy)titanium dimethoxide, (9-methyl-1,2,3, 4,5,6,7,8-octahydrofluorenyl)(butyryloxy)titanium dimethoxide, (9-methyl-1,2,3,4,5,6,7,8-octahydrofluorenyl)(acryloyloxy)titanium dimethoxide, (9-methyl-1,2,3,4,5,6,7,8-octahydrofluorenyl)(propioloyloxy)titanium dimethoxide, (9-methyl-1,2,3,4,5,6,7,8-octahydrofluorenyl)(methacryloyloxy)titanium dimethoxide, (9-methyl-1,2,3,4,5,6,7,8-octahydrofluorenyl)(naphthoyloxy)titanium dimethoxide, (9-methyl-1,2,3,4,5,6,7,8-octahydrofluorenyl)(cyclohexylcarbonyloxy)titanium dimethoxide, dimethyl(1,2,3,4,5,6,7,8-octahydrofluorenyl) (benzoyloxy)titanium, dimethyl(1,2,3,4,5,6,7,8-octahydrofluorenyl)(acetoxy)titanium, dimethyl(1,2,3, 4,5,6,7,8-octahydrofluorenyl)(trimethylacetoxy) titanium, dimethyl(1,2,3,4,5,6,7,8-octahydrofluorenyl) (p-fluorobenzoyloxy)titanium, dimethyl(1,2,3,4,5,6,7, 8-octahydrofluorenyl)(triphenylacetoxy)titanium, dimethyl(1,2,3,4,5,6,7,8-octahydrofluorenyl) (formyloxy)titanium, dimethyl(1,2,3,4,5,6,7,8-octahydrofluorenyl)(propionyloxy)titanium, dimethyl (1,2,3,4,5,6,7,8-octahydrofluorenyl)(butyryloxy) titanium, dimethyl(1,2,3,4,5,6,7,8-octahydrofluorenyl) (acryloyloxy)titanium, dimethyl(1,2,3,4,5,6,7,8-octahydrofluorenyl)(propioloyloxy)titanium, dimethyl (1,2,3,4,5,6,7,8-octahydrofluorenyl)(methacryloyloxy) titanium, dimethyl(1,2,3,4,5,6,7,8-octahydrofluorenyl) (naphthoyloxy)titanium, dimethyl(1,2,3,4,5,6,7,8-octahydrofluorenyl)(cyclohexylcarbonyloxy)titanium, dimethyl(9-methyl-1,2,3,4,5,6,7,8-octahydrofluorenyl) (benzoyloxy)titanium, dimethyl(9-methyl-1,2,3,4,5,6, 7,8-octahydrofluorenyl)(acetoxy)titanium, dimethyl(9-methyl-1,2,3,4,5,6,7,8-octahydrofluorenyl) (trimethylacetoxy)titanium, dimethyl(9-methyl-1,2,3, 4,5,6,7,8-octahydrofluorenyl)(p-fluorobenzoyloxy) titanium, dimethyl(9-methyl-1,2,3,4,5,6,7,8-octahydrofluorenyl)(triphenylacetoxy)titanium, dimethyl(9-methyl-1,2,3,4,5,6,7,8-octahydrofluorenyl) (formyloxy)titanium, dimethyl(9-methyl-1,2,3,4,5,6,7, 8-octahydrofluorenyl)(propionyloxy)titanium, dimethyl(9-methyl-1,2,3,4,5,6,7,8-octahydrofluorenyl) (butyryloxy)titanium, dimethyl(9-methyl-1,2,3,4,5,6,7, 8-octahydrofluorenyl)(acryloyloxy)titanium, dimethyl (9-methyl-1,2,3,4,5,6,7,8-octahydrofluorenyl) (propioloyloxy)titanium, dimethyl(9-methyl-1,2,3,4,5, 6,7,8-octahydrofluorenyl)(methacryloyloxy)titanium, dimethyl(9-methyl-1,2,3,4,5,6,7,8-octahydrofluorenyl) (naphthoyloxy)titanium, dimethyl(9-methyl-1,2,3,4,5, 6,7,8-octahydrofluorenyl)(cyclohexylcarbonyloxy) titanium, (1,2,3,4,5,6,7,8-octahydrofluorenyl)(benzoyloxy) titanium dichloride, (1,2,3,4,5,6,7,8-octahydrofluorenyl)(acetoxy)titanium dichloride, (1,2, 3,4,5,6,7,8-octahydrofluorenyl)(trimethylacetoxy) titanium dichloride, (1,2,3,4,5,6,7,8-octahydrofluorenyl)(p-fluorobenzoyloxy)titanium dichloride, (1,2,3,4,5,6,7,8-octahydrofluorenyl) (triphenylacetoxy)titanium dichloride, (1,2,3,4,5,6,7,8-octahydrofluorenyl)(formyloxy)titanium dichloride, (1,2,3,4,5,6,7,8-octahydrofluorenyl)(propionyloxy) titanium dichloride, (1,2,3,4,5,6,7,8-octahydrofluorenyl)(butyryloxy)titanium dichloride, (1,2,3,4,5,6,7,8-octahydrofluorenyl)(acryloyloxy) titanium dichloride, (1,2,3,4,5,6,7,8-octahydrofluorenyl)(propioloyloxy)titanium dichloride, (1,2,3,4,5,6,7,8-octahydrofluorenyl) (methacryloyloxy)titanium dichloride, (1,2,3,4,5,6,7,8-octahydrofluorenyl)(naphthoyloxy)titanium dichloride, (1,2,3,4,5,6,7,8-octahydrofluorenyl) (cyclohexylcarbonyloxy)titanium dichloride, (9-methyl-1,2,3,4,5,6,7,8-octahydrofluorenyl) (benzoyloxy)titanium dichloride, (9-methyl-1,2,3,4,5, 6,7,8-octahydrofluorenyl)(acetoxy)titanium dichloride, (9-methyl-1,2,3,4,5,6,7,8-octahydrofluorenyl) (trimethylacetoxy)titanium dichloride, (9-methyl-1,2, 3,4,5,6,7,8-octahydrofluorenyl)(p-fluorobenzoyloxy) titanium dichloride, (9-methyl-1,2,3,4,5,6,7,8-octahydrofluorenyl)(triphenylacetoxy)titanium dichloride, (9-methyl-1,2,3,4,5,6,7,8-octahydrofluorenyl)(formyloxy)titanium dichloride, (9-methyl-1,2,3,4,5,6,7,8-octahydrofluorenyl) (propionyloxy)titanium dichloride, (9-methyl-1,2,3,4, 5,6,7,8-octahydrofluorenyl)(butyryloxy)titanium dichloride, (9-methyl-1,2,3,4,5,6,7,8-octahydrofluorenyl)(acryloyloxy)titanium dichloride, (9-methyl-1,2,3,4,5,6,7,8-octahydrofluorenyl) (propioloyloxy)titanium dichloride, (9-methyl-1,2,3,4, 5,6,7,8-octahydrofluorenyl)(methacryloyloxy)titanium dichloride, (9-methyl-1,2,3,4,5,6,7,8-octahydrofluorenyl)(naphthoyloxy)titanium dichloride, (9-methyl-1,2,3,4,5,6,7,8-octahydrofluorenyl) (cyclohexylcarbonyloxy)titanium dichloride, and the like.

Examples of the transition metal compounds represented by general formula (13) also include compounds obtained by replacing titanium in the above compounds with zirconium or hafnium and similar compounds of transition metals of other Groups of the Periodic Table or the lanthanoid group. Of course, the transition metal compound represented by general formula (13) is not limited to the compounds shown above as examples. Among these compounds, titanium compounds are preferable from the standpoint of the catalytic activity.

As component (b) used in the present invention, (i) a compound which can form an ionic complex by reaction with the transition metal compound of component (a) or (ii) a compound containing oxygen is used.

As component (i), i.e., the compound which can form an ionic complex by reaction with the transition metal compound of component (a), a coordinated complex comprising a cation and an anion in which a plurality of groups are bonded to a metal or a Lewis acid can be used. As the coordinated complex comprising a cation and an anion in which a plurality of groups are bonded to a metal, various compounds can be used. Preferable examples of such compounds include compounds represented by following general formula (17) or (18):

$$([L^1-H]^{p+})_q([M^2X^1X^2\ldots X^n]^{(n-m)-})_i \qquad (17)$$

$$([L^2]^{p+})_q([M^3X^1X^2\ldots X^n]^{(n-m)-})_i \qquad (18)$$

wherein $L^2$ represents $M^4$, $R^{21}R^{22}M^5$, or $R^{23}{}_3C$ which are described later; $L^1$ represents a Lewis acid; $M^2$ and $M^3$ each represents a metal selected from metals of Group 5 to 15 of the Periodic Table; $M^4$ represents a metal selected from metals of Group 1 and Group 8 to 12 of the Periodic Table; $M^5$ represents a metal selected from metals of Groups 8 to 10 of the Periodic Table; $X^1$ to $X^n$ each represents hydrogen atom, a dialkylamino group, an alkoxy group, an aryloxy group, an alkyl group having 1 to 20 carbon atoms, an aryl, an alkylaryl group, or an arylalkyl group each having 6 to 20 carbon atoms, a substituted alkyl group, an organometalloid group, or a halogen atom; $R^{21}$ and $R^{22}$ each represents cyclopentadienyl group, a substituted cyclopentadienyl group, an indenyl group, or a fluorenyl group; $R^{23}$ represents an alkyl group; m represents a valence of $M^2$ or $M^3$ which is an integer of 1 to 7; n represents an integer of 2 to 8; p represents an ionic valence of $L^1$—H or $L^2$ which is an integer of 1 to 7; q represents an integer of 1 or more; and i=q×p/(n−m).

$M^2$ and $M^3$ each represents a metal selected from metals of Groups 5 to 15 of the Periodic Table, such as B, Al, Si, P, As, Sb, and the like; $M^4$ represents a metal selected from metals of Group 1 and Groups 8 to 12 of the Periodic Table, such as Ag, Cu, Na, Li, and the like; and $M^5$ represents a metal selected from metals of Groups 8 to 10 of the Periodic Table, such as Fe, Co., Ni, and the like. Examples of $X^1$ to $X^n$ include dialkylamino groups, such as dimethylamino group, diethylamino group, and the like; alkoxy groups, such as methoxy group, ethoxy group, n-butoxy group, and the like; aryloxy groups, such as phenoxy group, 2,6-dimethylphenoxy group, naphthyloxy group, and the like; alkyl groups having 1 to 20 carbon atoms, such as methyl group, ethyl group, n-propyl group, isopropyl group, n-butyl group, n-octyl group, 2-ethylhexyl group, and the like; aryl groups, alkylaryl groups, and arylalkyl groups each having 6 to 20 carbon atoms, such as phenyl group, p-tolyl group, benzyl group, pentafluorophenyl group, 3,5-di(trifluoromethyl)phenyl group, 4-tertiary-butylphenyl group, 2,6-dimethylphenyl group, 3,5-dimethylphenyl group, 2,4-dimethylphenyl group, 1,2-dimethylphenyl group, and the like; halogen atoms, such as F, Cl, Br, and I; and organometalloid groups, such as pentamethylantimony group, trimethylsilyl group, trimethylgermyl group, diphenylarsine group, dicyclohexylantimony group, diphenylboron group, and the like. Examples of the substituted cyclopentadienyl group represented by each of $R^{21}$ and $R^{22}$ include methylcyclopentadienyl group, butylcyclopentadienyl group, pentamethylcyclopentadienyl group, and the like.

In the present invention, examples of the anion in which a plurality of groups are bonded to a metal include $B(C_6F_5)_4^-$, $B(C_6HF_4)_4^-$, $B(C_6H_2F_3)_4^-$, $B(C_6H_3F_2)_4^-$, $B(C_6H_4F)_4^-$, $B(C_6CF_3F_4)_4^-$, $PF_6^-$, $P(C_6F_5)_6^-$, $Al(C_6HF_4)_4^-$, and the like.

Examples of the metal cation include $Cp_2Fe^+$, $(MeCP)_2Fe^+$, $(tBuCp)_2Fe^+$, $(Me_2Cp)_2Fe^+$, $(Me_3Cp)_2Fe^+$, $(Me_4CP)_2Fe^+$, $(Me_5Cp)_2Fe^+$, $Ag^+$, $Na^+$, $Li^+$, and the like. Other examples of the cation include cations of compounds containing nitrogen, such as pyridinium cation, 2,4-dinitro-N,N-diethylanilinium cation, diphenylammonium cation, p-nitroanilinium cation, 2,5-dichloroanilinium cation, p-nitro-N,N-dimethylanilinium cation, quinolinium cation, N,N-dimethylanilinium cation, N,N-diethylanilinium cation, and the like; cations of carbenium compounds, such as triphenylcarbenium cation, tri(4-methylphenyl)carbenium cation, tri(4-methoxyphenyl)carbenium cation, and the like; alkylphosphonium ions, such as $CH_3PH_3^+$, $C_2H_5PH_3^+$, $C_3H_7PH_3^+$, $(CH_3)_2PH_2^+$, $(C_2H_5)_2PH_2^+$, $(C_3H_7)_2PH_2^+$, $(CH_3)_3PH^+$, $(C_2H_5)_3PH^+$, $(C_3H_7)_3PH^+$, $(CF_3)_3PH^+$, $(CH_3)_4P^+$, $(C_2H_5)_4P^+$, $(C_3H_7)_4P^+$, and the like; and arylphosphonium ions, such as $C_6H_5PH_3^+$, $(C_6H_5)_2PH_2^+$, $(C_6H_5)_3PH^+$, $(C_6H_5)_4P^+$, $(C_2H_5)_2(C_6H_5)PH^+$, $(CH_3)_2(C_6H_5)PH_2^+$, $(CH_3)_2(C_6H_5)PH^+$, $(C_2H_5)_2(C_6H_5)_2P^+$, and the like.

In the present invention, coordinated complexes comprising any combination of the above metal cations and anions can be used.

Among the compounds represented by general formula (17) or (18), specifically, the following compounds are preferably used. Examples of the compounds represented by general formula (17) include triethylammonium tetraphenylborate, tri(n-butyl)ammonium tetraphenylborate, trimethylammonium tetraphenylborate, triethylammonium tetrakis(pentafluorophenyl)borate, tri(n-butyl)ammonium tetrakis(pentalfuorophenyl)borate, triethylammonium hexafluoroarsenate, pyridinium tetrakis(pentafluorophenyl)borate, pyrrolinium tetra(pentafluorophenyl)borate, N,N-dimethylanilinium tetrakis(pentafluorophenyl)borate, methyldiphenylammonium tetrakis(pentaluforophenyl)borate, and the like. Examples of the compounds represented by general formula (18) include ferrocenium tetraphenylborate, dimethylferrocenium tetrakis(pentafluorophenyl)borate, ferrocenium tetrakis(pentafluorophenyl)borate, decamethylferrocenium tetrakis(pentafluorophenyl)borate, acetylferrocenium tetrakis(pentafluorophenyl)borate, formylferrocenium tetrakis(pentafluorophenyl)borate, cyanoferrocenium tetrakis(pentafluorophenyl)borate, silver tetraphenylborate, silver tetrakis(pentafluorophenyl)borate, trityl tetraphenylborate, trityl tetrakis(pentafluorophenyl)borate, silver hexafluoroarsenate, silver hexafluoroantimonate, silver tetrafluoroborate, and the like.

As the Lewis acid used in the present invention, for example, $B(C_6F_5)_3$, $B(C_6HF_4)_3$, $B(C_6H_2F_3)_3$, $B(C_6H_3F_2)_3$, $B(C_6H_4F)_3$, $B(C_6CF_3F_4)_3$, $BF_3$, $PF_5$, $P(C_6F_5)_5$, $Al(C_6HF_4)$, or the like can be used.

In the present invention, the compound which can form an ionic complex by reaction with the transition metal compound of component (i) may be used singly or as a combination of two or more types.

As the compound containing oxygen of component (ii), compounds having a linear structure which is represented by general formula (3):

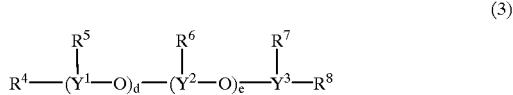

(3)

and/or compounds having a cyclic structure which is represented by general formula (4):

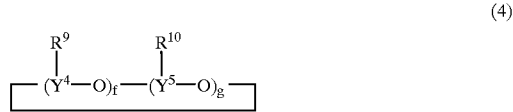

(4)

can be used.

In above general formulae (3) and (4), $R^4$ to $R^{10}$ each represents an alkyl group having 1 to 8 carbon atoms, such as methyl group, ethyl group, n-propyl group, isopropyl group, various types of butyl group, various types of pentyl group, various types of hexyl group, various types of heptyl group, and various types of octyl group. $R^4$ to $R^8$ may be the same with or different from each other. $R^9$ and $R^{10}$ may be the same with or different from each other. $Y^1$ to $Y^5$ each represents an element of Group 13 of the Periodic Table, such as B, Al, Ga, In, and Ti. Among these elements, B and Al are preferable. $Y^1$ to $Y^3$ may be the same with or different from each other. d to g each represents an integer of 0 to 50, and (d+e) and (f+g) each represents 1 or more. d, e, f, and g each preferably represents an integer in the range of 1 to 20, more preferably in the range of 1 to 5.

In the present invention, component (b) may contain, in place of or in combination with the above compounds of component (ii) which are represented by general formula (3)

and/or general formula (4), a branched compound containing oxygen which is represented by general formula (Z):

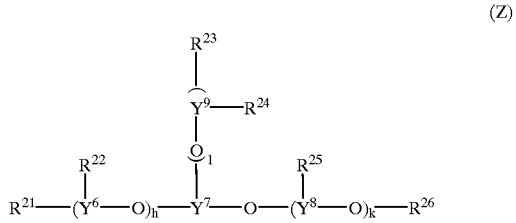

(Z)

wherein $R^{21}$ to $R^{26}$ each represents an alkyl group having 1 to 8 carbon atoms and may be the same with or different from each other, $Y^6$ to $Y^9$ each represents an element of Group 13 of the Periodic Table and may be the same with or different from each other, h, k, and l each represents an integer of 1 to 50, and $h+k+l \geq 3$. Component (b) may contain a branched compound containing oxygen which has a plurality of branches.

Two or more compounds containing oxygen which are represented by general formula (3), (4), or (Z) described above occasionally form a cage compound by association. Such a cage compound may also be used as component (b). The cage compound containing oxygen may have various forms depending on the number of the compounds containing oxygen which constitute the cage compound and the condition of association. Examples of the cage compound containing oxygen include compounds represented by general formulae (I) to (IV) described above.

As the compound represented by general formula (3) or (4), reaction products of organoaluminum compounds and water are preferably used. The main components of the reaction products of organoaluminum compounds and water are alkylaluminoxanes having a chain structure which are represented by general formula (19):

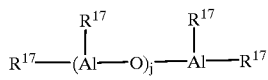

(19)

or alkylaluminoxanes having a cyclic structure which are represented by general formula (20)

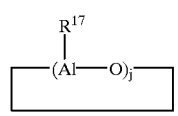

(20)

In general formulae (19) and (20), $R^{17}$ represents an alkyl group having 1 to 8 carbon atoms, such as methyl group, ethyl group, n-propyl group, isopropyl group, various types of butyl group, various types of pentyl group, various types of hexyl group, various types of heptyl group, and various types of octyl group; and j represents a number in the range of 1 to 50, preferably in the range of 1 to 20, more preferably in the range of 1 to 5.

As component (b), compounds represented by general formula (Z) in which $Y^6$ to $Y^9$ each represents aluminum may be used in place of or in combination with the aluminoxane of component (ii) which is represented by general formula (19) and/or general formula (20) described above.

Two or more molecules of the above aluminoxane represented by general formula (19), or (20) occasionally form a cage compound by association. Such a cage compound may also be used as component (b). The cage compound containing oxygen may have various forms depending on the number of the aluminoxane which constitute the cage compound and the condition of association. Examples of the cage compound include the following compounds represented by general formulae (V) to (VII).

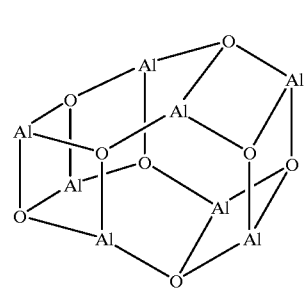

(V)

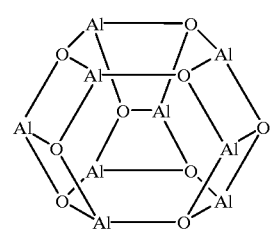

(VI)

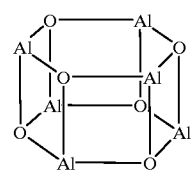

(VII)

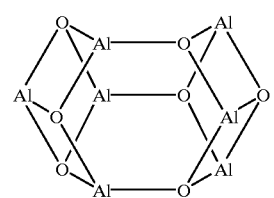

(VIII)

As the organoaluminum compound which is reacted with water, it is generally preferable that a trialkylaluminum, such as trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, triheptylaluminum, and the like, is used. The reaction product of the trialkylaluminum and water generally contains alkylaluminoxanes having a chain structure and alkylaluminoxanes having a cyclic structure described above as the main components and further contains the unreacted trialkylaluminum, various types of condensation products, and molecules formed by association of these compounds in a complicated manner. Various reaction products are formed depending on the conditions in which the trialkylaluminum and water are brought into contact with each other. The method of reacting a trialkylaluminum with water is not particularly limited, and a conventional method can be used.

Specific examples of the compounds contained in the reaction product of an organoaluminum compound and water include methylalumioxane, ethylaluminoxane, n-propylaluminoxane, isopropylaluminoxane, n-butylaluminoxane, isobutylaluminoxane, t-butylaluminoxane, pentylaluminoxanes, hexylaluminoxanes, heptylaluminoxanes, and the like.

As the compound containing oxygen which further contains both aluminum and boron, compounds described in Japanese Patent Application Laid-Open No. Heisei 6(1994)-172438 and Japanese Patent Application Laid-Open No. Heisei 6(1994)-172439 are known.

In the present invention, the compound containing oxygen of component (b) may be used singly or as a combination of two or more compounds. A combination of one or more compounds of component (i) and one or more compounds of component (ii) may also be used as component (b).

In the present invention, an alkylating agent may be used as component (c). Various compounds can be used as the alkylating agent. Examples of the compound used as the alkylating agent include:

aluminum compounds having alkyl groups represented by general formula (21)

$$R^{18}{}_m Al(OR^{19})_n V_{3-m-n} \qquad (21)$$

wherein $R^{18}$ and $R^{19}$ each represents an alkyl group having 1 to 8 carbon atoms, preferably 1 to 4 carbon atoms; V represents hydrogen atom or a halogen atom; m represents a number of $0<m\leq 3$, preferably 2 or 3, more preferably 3; and n represents a number of $0\leq n<3$, preferably 0 or 1;

magnesium compounds having alkyl groups which are represented by general formula (22):

$$R^{18}{}_2 Mg \qquad (22)$$

wherein $R^{18}$ is as defined above; and zinc compounds having alkyl groups which are represented by general formula (23):

$$R^{18}{}_2 Zn \qquad (23)$$

wherein $R^{18}$ is as defined above.

Among these compounds having alkyl groups, aluminum compounds having alkyl groups are preferable, and trialkylaluminums and dialkylaluminum compounds are more preferable. Examples of the preferable compounds include trialkylaluminums, such as trimethylaluminum, triethylaluminum, tri-n-propylaluminum, triisopropylaluminum, tri-n-butylaluminum, triisobutylaluminum, tri-t-butylaluminum, and the like; dialkylaluminum halides, such as dimethylaluminum chloride, diethylaluminum chloride, di-n-propylaluminum chloride, diisopropylaluminum chloride, di-n-butylaluminum chloride, diisobutylaluminum chloride, di-t-butylaluminum chloride, and the like; dialkylaluminum alkoxides, such as dimethylaluminum methoxide, dimethylaluminum ethoxide, and the like; dialkylaluminum hydrides, such as dimethylalunimum hydride, diethylaluminum hydrides, diisobutylaluminum hydride, and the like; and the like compounds. Further examples of the compounds having alkyl groups include dialkylmagnesiums, such as dimethylmagnesium, diethylmagnesium, di-n-propylmagnesium, diisopropylmagnesium, and the like; and dialkylzincs, such as dimethylzinc, diethylzinc, di-n-propylzinc, diisopropylzinc, and the like.

The present invention provides the polymerization catalyst comprising component (a), component (b), and where necessary, component (c) as described above. When various types of monomer are polymerized, a reaction product of a linear alkylaluminum in which the alkyl group has 2 or more carbon atoms and water can be added as a chain transfer agent.

When the polymerization catalyst of the present invention is prepared, component (a), component (b) and component (c), which is used where necessary, may be added to the monomer separately, and the time of addition is not particularly limited. Component (a), component (b), or component (c) may be preliminarily mixed with a solvent for diluting the catalyst which is an aromatic hydrocarbon such as toluene, ethylbenzene, and the like, or an aliphatic hydrocarbon such as hexane, heptane, and the like, before the catalyst components are mixed with the monomer, and the time of addition of the components mixed with the solvent is not particularly limited. Where necessary, the entire amount or a portion of component (c) may be added to the monomer after other components have been added.

The addition of component (a), component (b), and component (c), which is used where necessary, can be conducted, of course, at the temperature of polymerization. It is also possible that the addition is conducted at a temperature of 0 to 100° C.

The above catalyst exhibits particularly high activity in the production of styrenic polymers having the syndiotactic configuration or the like polymers.

To produce a polymer in accordance with the process of the present invention, various monomers are polymerized or copolymerized in the presence of the catalyst comprising the above components (a) and (b) as the main components. As the monomer used for the polymerization, aromatic vinyl compounds, such as styrene and the like, and substituted aromatic vinyl compounds, such as p-methylstyrene and the like, can be used. α-Olefins of $C_2$ to $C_{20}$, dienes, such as isoprene and the like, and alkynes, such as acetylene and the like, can also be used, and α-Olefins of $C_2$ to $C_{10}$, such as ethylene, propylene, and the like, are preferable.

These monomers may be used for homopolymerization of a single monomer selected from these monomers or copolymerization of two or more monomers selected from these monomers. The amounts of the monomer components are not particularly limited. Compounds contained in the used monomers are not particularly limited. However, it is preferable that the contents of phenylacetylene, indene, and compounds derived from these compounds are 50 ppm or less.

Examples of the monomers preferably used in the present invention include compounds represented by following general formula (24)

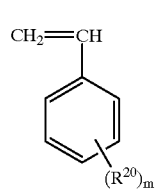

(24)

wherein $R^{20}$ represents hydrogen atom, a halogen atom, or a hydrocarbon group having 20 or less carbon atoms, m represents an integer of 1 to 5, and when m represents an integer of 2 or more, a plurality of $R^{20}$ may be the same with or different from each other. Specific examples of the above compound include styrene; alkylstyrenes, such as p-methylstyrene, m-methylstyrene, o-methylstyrene, 2,4-dimethylstyrene, 2,5-dimethylstyrene, 3,4-dimethylstyrene, 3,5-dimethylsyrene, p-ethylstyrne, m-ethylstyrene, p-tertiary-butylstyrene, and the like; vinylbenzenes, such as p-divinylbenzene, m-divinylbenzene, tridivinylbenzene, and the like; halogenated styrenes, such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methyl-p-fluorostyrene, and the like; alkoxystyrenes, such as methoxystyrene, ethoxystyrene, t-butoxystyrene, and the like; and mixtures of two or more types of these monomers.

In the polymerization of monomers by using the polymerization catalyst of the present invention, the process and the conditions for the polymerization are not particularly limited. Therefore, the bulk polymerization may be conducted under the condition of the substantial absence of any inert hydrocarbon media, or the solution polymerization may be conducted in an inert hydrocarbon medium, such as an aliphatic hydrocarbon such as pentane, hexane, heptane, and the like, an alicyclic hydrocarbon such as cyclohexane and the like, and an aromatic hydrocarbon such as benzene, toluene, xylene, and the like. The temperature of the polymerization is not particularly limited, and is generally 0 to 120° C., preferably 20 to 90° C.

The polymerization may be conducted in the presence of hydrogen to adjust the molecular weight of the obtained styrenic polymer.

The polymer produced by using the polymerization catalyst of the present invention has the syndiotactic configuration. The syndiotactic configuration of the styrenic polymer means that the stereochemical structure has a highly syndiotactic configuration. In other words, phenyl groups and substituted phenyl groups of the side groups are alternately placed at the opposite positions with respect to the main chain formed with the carbon—carbon bonds. The tacticity in the stereochemical structure is quantitated by the measurement of the nuclear magnetic resonance using an isotope of carbon ($^{13}$C-NMR). The tacticity measured by the $^{13}$C-NMR method can show the content of a sequence in which a specific number of the constituting units are bonded in sequence, such as a diad in which two constituting units are bonded in sequence, a triad in which three constituting units are bonded in sequence, and a pentad in which five constituting units are bonded in sequence. In the present invention, "the styrenic polymer having the syndiotactic configuration" means polystyrene, a poly(alkylstyrene), a poly(halogenated styrene), a poly(alkoxystyrene), a poly(vinylbenzoic acid ester), a mixture of these polymers, or a copolymer containing constituting units of these polymers as the main components, which generally has a syndiotacticity of 75% or more, preferably 85% or more, expressed in terms of the content of the racemic diad, or 30% or more, preferably 50% or more, expressed in terms of the content of the racemic pentad.

The present invention is described more specifically with reference to examples and comparative examples in the following. However, the present invention is not limited by these examples.

PREPARATION EXAMPLE 1

Synthesis of (pentamethylcyclopentadienyl)tris(benzoyloxy)titanium

Into a reactor which had been purged with nitrogen sufficiently, 30 ml of hexane and 2.28 g of benzoic acid ($C_6H_5COOH$) were placed. To the obtained solution, 1.72 g of pentamethylcyclopentadienyltitanium trimethoxide ($Cp^*Ti(OMe)_3$) dissolved in 20 ml of toluene was added at a low temperature, and the obtained mixture was stirred at a room temperature. Then, the solvent was removed from the mixture, and 3 g of a compound giving the following result of measurement was obtained:

$^1$H-NMR (400 MHz, CDCl$_3$) (ppm); 2.1 (s, 15H); 7.3~8.1 (m, 15H)

It was found that the obtained compound was (pentamethylcyclopnetadienyl)tris(benzoyloxy)titanium ($Cp^*Ti(OCOC_6H_5)_3$) which was the object of the synthesis.

PREPARATION EXAMPLE 2

Synthesis of (pentamethylcyclopentadienyl)bis(benzoyloxy)titanium methoxide

The same procedures as those conducted in Preparation Example 1 were conducted except that 1.52 g of benzoic acid ($C_6H_5COOH$) was used in place of 2.28 g of benzoic acid ($C_6H_5COOH$) used in Preparation Example 1, and 2.8 g of a compound giving the following result of measurement was obtained:

$^1$H-NMR (400 MHz, CDCl$_3$) (ppm); 2.0 (s, 15H); 4.3 (s, 3H); 7.3~8.1 (m, 10H)

It was found that the obtained compound was (pentamethylcyclopnetadienyl)bis(benzoyloxy)titanium methoxide ($Cp^*Ti(OMe)(OCOC_6H_5)_2$) which was the object of the synthesis.

PREPARATION EXAMPLE 3

Synthesis of (pentamethylcyclopentadienyl)(benzoyloxy)titanium dimethoxide

The same procedures as those conducted in Preparation Example 1 were conducted except that 0.76 g of benzoic acid ($C_6H_5COOH$) was used in place of 2.28 g of benzoic acid ($C_6H_5COOH$) used in Preparation Example 1, and 2.0 g of a compound giving the following result of measurement was obtained:

$^1$H-NMR (400 MHz, CDCl$_3$) (ppm); 2.0 (s, 15H); 4.1 (s, 6H); 7.3~8.1 (m, 5H)

It was found that the obtained compound was (pentamethylcyclopnetadienyl)(benzoyloxy)titanium dimethoxide ($Cp^*Ti(OMe)_2(OCOC_6H_5)$) which was the object of the synthesis.

PREPARATION EXAMPLE 4

Synthesis of (pentamethylcyclopentadienyl)tris(acetoxy)titanium

Into a reactor which had been purged with nitrogen sufficiently, 40 ml of toluene and 4.77 g of pentamethylcyclopentadienyltitanium trimethoxide ($Cp^*Ti(OMe)_3$) were placed. To the obtained solution, 2.96 ml of acetic acid (MeCOOH) was added, and the obtained mixture was stirred at a room temperature. Then, the solvent was removed from the mixture, and 3.3 g of a compound giving the following result of measurement was obtained:

$^1$H-NMR (400 MHz, CDCl$_3$) (ppm); 2.02 (s, 15H); 2.03 (s, 9H)

It was found that the obtained compound was (pentamethylcyclopentadienyl)tris(acetoxy)titanium ($Cp^*Ti(OCOMe)_3$) which was the object of the synthesis.

PREPARATION EXAMPLE 5

Synthesis of (pentamethylcyclopentadienyl)tris(trimethylacetoxy)titanium

Into a reactor which had been purged with nitrogen sufficiently, 20 ml of toluene and 3.19 g of trimethylacetic acid (($CH_3)_3CCOOH$) were placed. To the obtained solution, 2.87 g of pentamethylcyclopentadienyltitanium trimethoxide ($Cp^*Ti(OMe)_3$) and 26.3 ml of toluene were added at a low temperature, and the obtained mixture was stirred at a room temperature. Then, the solvent was removed from the mixture, and 3.9 g of a compound giving the following result of measurement was obtained:

$^1$H-NMR (400 MHz, CDCl$_3$) (ppm); 1.11 (s, 27H); 1.97 (s, 15H)

It was found that the obtained compound was (pentamethylcyclopnetadienyl)tris(trimethylacetoxy) titanium (Cp*Ti(OCOC(CH$_3$)$_3$)$_3$) which was the object of the synthesis.

PREPARATION EXAMPLE 6

Synthesis of (pentamethylcyclopentadienyl)tris (triphenylacetoxy)titanium

Into a reactor which had been purged with nitrogen sufficiently, 20 ml of toluene and 4.33 g of triphenylacetic acid ((C$_6$H$_5$)$_3$CCOOH) were placed. To the obtained solution, 1.38 g of pentamethylcyclopentadienyltitanium trimethoxide (Cp*Ti(OMe)$_3$) and 8.52 ml of toluene were added at a low temperature, and the obtained mixture was stirred at a room temperature. Then, the solvent was removed from the mixture, and 1.2 g of a compound giving the following result of measurement was obtained:

$^1$H-NMR (400 MHz, CDCl$_3$) (ppm); 1.71 (s, 15H); 7.0~7.3 (m, 45H)

It was found that the obtained compound was (pentamethylcyclopnetadienyl)tris(triphenylacetoxy) titanium (Cp*Ti(OCOC(C$_6$H$_5$)$_3$)$_3$) which was the object of the synthesis.

EXAMPLE 1

In a vessel which had an inner volume of 50 ml and had been dried and purged with nitrogen, 31.2 ml of toluene, 0.8 ml of a 2.0 mol/liter solution of triisobutylaluminum, 64 mg of dimethylanilinium tetra(pentafluorophenyl)borate (HN(Me)$_2$C$_6$H$_5$) (B(C$_6$F$_5$)$_4$), and 8 ml of a 0.01 mol/liter solution of (pentamethylcyclopentadienyl)tris(benzoyloxy) titanium (Cp*Ti(OCOC$_6$H$_5$)$_3$) obtained in Preparation Example 1 were mixed together to prepare 40 ml of a preliminarily mixed catalyst solution.

Into a vessel which had an inner volume of 30 ml and had been dried and purged with nitrogen, 10 ml of styrene was placed and heated to 70° C. Then, 250 μl of the preliminarily mixed catalyst solution prepared above was added, and the polymerization was allowed to proceed at 70° C. for 4 hours. After finishing the reaction by adding methanol, the product was dried to obtain 4.59 g of SPS (syndiotactic polystyrene). The weight-average molecular weight of the obtained polymer was 797,000 (the catalytic activity for producing SPS was 192 kg/gTi).

EXAMPLE 2

The same procedures as those conducted in Example 1 were conducted except that pentamethylcyclopentadienyl) bis(benzoyloxy)titanium methoxide (CP*Ti(OMe) (OCOC$_6$H$_5$)$_2$) obtained in Preparation Example 2 was used in place of (pentamethylcyclopentadienyl)tris(benzoyloxy) titanium (Cp*Ti(OCOC$_6$H5)3) which was obtained in Preparation Example 1 and used in Example 1.

The yield of SPS was 4.7 g, and the weight-average molecular weight of the obtained polymer was 760,000.

EXAMPLE 3

The same procedures as those conducted in Example 1 were conducted except that pentamethylcyclopentadienyl) (benzoyloxy)titanium dimethoxide (Cp*Ti(OMe)$_2$ (OCOC$_6$H$_5$)) obtained in Preparation Example 3 was used in place of (pentamethylcyclopentadienyl)tris(benzoyloxy) titanium (Cp*Ti(OCOC$_6$H$_5$)$_3$) which was obtained in Preparation Example 1 and used in Example 1.

The yield of SPS was 4.8 g, and the weight-average molecular weight of the obtained polymer was 800,000.

EXAMPLE 4

In a vessel which had an inner volume of 50 ml and had been dried and purged with nitrogen, 30.4 ml of toluene, 1.5 ml of a 2.0 mol/liter solution of triisobutylaluminum, 5.7 ml of a 1.6 mol/liter toluene solution of methylaluminoxane, and 2.4 ml of a 0.05 mol/liter solution of (pentamethylcyclopentadienyl)tris(benzoyloxy)titanium (Cp*Ti(OCOC$_6$H$_5$)$_3$) obtained in Preparation Example 1 were mixed together to prepare 40 ml of a preliminarily mixed catalyst solution.

Into a vessel which had an inner volume of 30 ml and had been dried and purged with nitrogen, 10 ml of styrene was placed and heated to 70° C. Then, 83 μl of the preliminarily mixed catalyst solution prepared above was added, and the polymerization was allowed to proceed at 70° C. for 4 hours. After finishing the reaction by adding methanol, the product was dried to obtain 4.03 g of SPS. The weight-average molecular weight of the obtained polymer was 1,199,000 (the catalytic activity for producing SPS was 338 kg/gTi).

EXAMPLE 5

The same procedures as those conducted in Example 4 were conducted except that (pentamethylcyclopentadienyl) bis(benzoyloxy)titanium methoxide (CP*Ti(OMe) (OCOC$_6$Hs)2) obtained in Preparation Example 2 was used in place of (pentamethylcyclopentadienyl)tris(benzoyloxy) titanium (Cp*Ti(OCOC$_6$Hr5)3) which was obtained in Preparation Example 1 and used in Example 4.

The yield of SPS was 4.1 g, and the weight-average molecular weight of the obtained polymer was 1,170,000.

EXAMPLE 6

The same procedures as those conducted in Example 4 were conducted except that (pentamethylcyclopentadienyl) (benzoyloxy)titanium dimethoxide (Cp*Ti(OMe)$_2$ (OCOC$_6$H$_5$)) obtained in Preparation Example 3 was used in place of (pentamethylcyclopentadienyl)tris(benzoyloxy) titanium (Cp*Ti(OCOC$_6$H$_5$)$_3$) which was obtained in Preparation Example 1 and used in Example 4.

The yield of SPS was 4.2 g, and the weight-average molecular weight of the obtained polymer was 1,200,000.

EXAMPLE 7

The same procedures as those conducted in Example 1 were conducted except that (pentamethylcyclopentadienyl) tris(acetoxy)titanium (CP*Ti(OMe)(OCOMe)$_3$) obtained in Preparation Example 4 was used in place of (pentamethylcyclopentadienyl)tris(benzoyloxy)titanium (Cp*Ti(OCOC$_6$H$_5$)$_3$) which was obtained in Preparation Example 1 and used in Example 1.

The yield of SPS was 3.5 g, and the weight-average molecular weight of the obtained polymer was 760,000.

EXAMPLE 8

The same procedures as those conducted in Example 1 were conducted except that (pentamethylcyclopentadienyl) tris(trimethylacetoxy)titanium (Cp*Ti(OCOC(CH$_3$)$_3$)$_3$) obtained in Preparation Example 5 was used in place of (pentamethylcyclopentadienyl)tris(benzoyloxy)titanium (Cp*Ti(OCOC$_6$H$_5$)$_3$) which was obtained in Preparation Example 1 and used in Example 1.

The yield of SPS was 2.0 g, and the weight-average molecular weight of the obtained polymer was 860,000.

EXAMPLE 9

The same procedures as those conducted in Example 1 were conducted except that (pentamethylcyclopentadienyl)

tris(triphenylacetoxy)titanium (Cp*Ti(OCOC($C_6H_5$)$_3$)$_3$) obtained in Preparation Example 6 was used in place of (pentamethylcyclopentadienyl)tris(benzoyloxy)titanium (Cp*Ti(OCOC$_6$H$_5$)$_3$) which was obtained in Preparation Example 1 and used in Example 1.

The yield of SPS was 2.4 g, and the weight-average molecular weight of the obtained polymer was 950,000.

EXAMPLE 10

The same procedures as those conducted in Example 4 were conducted except that (pentamethylcyclopentadienyl)tris(acetoxy)titanium (Cp*Ti(OMe)(OCOMe)$_3$) obtained in Preparation Example 4 was used in place of (pentamethylcyclopentadienyl)tris(benzoyloxy)titanium (Cp*Ti(OCOC$_6$H$_5$)$_3$) which was obtained in Preparation Example 1 and used in Example 4.

The yield of SPS was 2.2 g, and the weight-average molecular weight of the obtained polymer was 1,320,000.

EXAMPLE 11

The same procedures as those conducted in Example 4 were conducted except that (pentamethylcyclopentadienyl)tris(trimethylacetoxy)titanium (Cp*Ti(OCOC(CH$_3$)$_3$)$_3$) obtained in Preparation Example 5 was used in place of (pentamethylcyclopentadienyl)tris(benzoyloxy)titanium (Cp*Ti(OCOC$_6$H$_5$)$_3$) which was obtained in Preparation Example 1 and used in Example 4.

The yield of SPS was 3.2 g, and the weight-average molecular weight of the obtained polymer was 1,240,000.

EXAMPLE 12

The same procedures as those conducted in Example 4 were conducted except that (pentamethylcyclopentadienyl)tris(benzoyloxy)titanium (Cp*Ti(OCOC($C_6H_5$)$_3$)$_3$) obtained in Preparation Example 6 was used in place of (pentamethylcyclopentadienyl)tris(benzoyloxy)titanium (Cp*Ti(OCOC$_6$H$_5$)$_3$) which was obtained in Preparation Example 1 and used in Example 4.

The yield of SPS was 3.2 g, and the weight-average molecular weight of the obtained polymer was 1,150,000.

COMPARATIVE EXAMPLE 1

In a vessel which had an inner volume of 50 ml and had been dried and purged with nitrogen, 31 ml of toluene, 0.8 ml of a 2.0 mol/liter solution of triisobutylaluminum, 64 mg of dimethylanilinium tetra(pentafluorophenyl)borate (HN(Me)$_2$C$_6$H$_5$) (B(C$_6$F$_5$)$_4$), and 8.2 ml of a 0.00977 mol/liter solution of Cp*TiCl$_3$ were mixed together to prepare 40 ml of a preliminarily mixed catalyst solution.

Into a vessel which had an inner volume of 30 ml and had been dried and purged with nitrogen, 10 ml of styrene was placed and heated to 70° C. Then, 250 µl of the preliminarily mixed catalyst solution prepared above was added, and the polymerization was allowed to proceed at 70° C. for 4 hours. After finishing the reaction by adding methanol, the product was dried to obtain 0.77 g of SPS. The weight-average molecular weight of the obtained polymer was 455,000 (the catalytic activity for producing SPS was 32 kg/gTi).

COMPARATIVE EXAMPLE 2

In a vessel which had an inner volume of 50 ml and had been dried and purged with nitrogen, 20.5 ml of toluene, 1.50 ml of a 2.0 mol/liter solution of triisobutylaluminum, 5.63 ml of a 1.6 mol/liter toluene solution of methylaluminoxane, and 12.3 ml of a 0.01 mol/liter solution of Cp*TiCl$_3$ were mixed together to prepare 40 ml of a preliminarily mixed catalyst solution.

Into a vessel which had an inner volume of 30 ml and had been dried and purged with nitrogen, 10 ml of styrene was placed and heated to 70° C. Then, 83 µl of the preliminarily mixed catalyst solution prepared above was added, and the polymerization was allowed to proceed at 70° C. for 4 hours. After finishing the reaction by adding methanol, the product was dried to obtain 0.72 g of SPS. The weight-average molecular weight of the obtained polymer was 810,000 (the catalytic activity for producing SPS was 63 kg/gTi).

INDUSTRIAL APPLICABILITY

By using the polymerization catalyst of the present invention, decrease in the contents of residual metals in obtained polymers, simplification of the process for producing polymers, and reduction of the production cost of polymers can be achieved. Physical properties of the polymer can also be improved because of the decreased contents of residual metals.

Polymers having a higher molecular weight than that obtained by using conventional polymerization catalyst systems can be obtained by polymerization in the presence of the polymerization catalyst of the present invention.

What is claimed is:

1. A polymerization catalyst comprising:
   (a) a transition metal compound represented by the following general formula (7) or general formula (8):

$$(RCOO)MC_pXY \qquad (7)$$

$$(RCOO)MC_pX \qquad (8)$$

wherein M represents a metal of Groups 3 to 6 of the Periodic Table or a lanthanoid metal; R represents hydrogen atom, an alkyl group having 1 to 50 carbon atoms, or an aryl group having 6 to 50 carbon atoms; Cp represents cyclopentadienyl group, or a substituted cyclopentadienyl group; X and Y each independently represent hydrogen atom, an alkyl group having 1 to 20 carbon atoms, an alkoxy group having 1 to 20 carbon atoms, an aryl group, an alkylaryl group, or an arylalkyl group each having 6 to 20 carbon atoms, an aryloxy group having 6 to 20 carbon atoms, an acyloxy group having 1 to 50 carbon atoms, vinyl group, allyl group, an ethynyl group, an amino group having 1 to 50 carbon atoms, an amido group, a phosphido group, an alkylthio group, an arylthio group, or a halogen atom, C represents carbon atom; and O represents oxygen atom; and (b)(i) a compound which can form an ionic complex by reaction with the transition metal compound of component (a) or
   (ii) a compound containing oxygen which is represented by general formula (3):

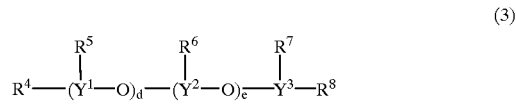

(3)

wherein $R^4$ to $R^8$ each represents an alkyl group having 1 to 8 carbon atoms and may be the same with or different from each other, $Y^1$ to $Y^3$ each represents an element of Group 13 of the Periodic Table and may be the same with or different from each other, d and e each represents a number of 0 to 50, and d+e represents 1 or more;

and/or general formula (4):

(4)

wherein $R^9$ and $R^{10}$ each represents an alkyl group having 1 to 8 carbon atoms and may be the same with or different from each other, $Y^1$ and $Y^5$ each represents an element of Group 13 of the Periodic Table and may be the same with or different from each other, f and g each represents a number of 0 to 50, and f+g represents 1 or more.

2. A polymerization catalyst according to claim 1, wherein the transition metal compound of component (a) is represented by any the following formulae:

$(RCOO)_n MCp(OR")_{3-n}$ $(RCOO)_m MCp(OR")_{2-m}$ wherein M, Cp, C, O, and R are as defined in claim 1, R" represents an alkyl group having 1 to 20 carbon atoms or an aryl group, an alkylaryl group, or an arylakyl group each having 1 to 50 carbon atoms, n represents an integer of 1 to 3, m represents 1 or 2, and any two groups of RCOO, Cp, and OR" may be bonded to each other.

3. A polymerization catalyst according to claim 1, which comprises (c) an organoaluminum compound in addition to component (a) and component (b).

4. A polymerization catalyst according to claim 2, which comprises (c) an organoaluminum compound in addition to component (a) and component (b).

5. A process for producing styrenic polymers having a syndiotactic configuration which comprises polymerizing a styrenic monomer in the presence of a polymerization catalyst described in claim 1.

6. A process for producing styrenic polymers having a syndiotactic configuration which comprises polymerizing a styrenic monomer in the presence of a polymerization catalyst described in claim 4.

* * * * *